United States Patent
Shimizu et al.

[11] Patent Number: 5,905,109
[45] Date of Patent: May 18, 1999

[54] WATER-TYPE DISPERSION COMPOSITION

[75] Inventors: Tatuya Shimizu, Yokkaichi; Toshinori Sakagami, Suzuka; Mibuko Kaburaki, Yokkaichi; Kinji Yamada, Tsukuba, all of Japan

[73] Assignee: JSR Corporation, Tokyo, Japan

[21] Appl. No.: 08/910,664

[22] Filed: Aug. 13, 1997

[30] Foreign Application Priority Data

Aug. 14, 1996 [JP] Japan ................................. 8-231253

[51] Int. Cl.$^6$ ................................................. C08L 83/00
[52] U.S. Cl. ........................................ 524/506; 524/504
[58] Field of Search ................................. 524/504, 505, 524/506

[56] References Cited

U.S. PATENT DOCUMENTS

| | | | |
|---|---|---|---|
| 3,686,356 | 8/1972 | Saam | 260/875 |
| 4,101,792 | 7/1978 | Lindemann | 524/506 |
| 4,433,007 | 2/1984 | Marwitz | 514/506 |
| 4,468,491 | 8/1984 | Steinberger | 524/504 |
| 4,469,840 | 9/1984 | Alberts | 524/505 |
| 4,994,523 | 2/1991 | Sasaki | 525/63 |
| 5,198,498 | 3/1993 | Valet et al. | 525/125 |
| 5,399,612 | 3/1995 | Calhoun | 524/506 |
| 5,405,691 | 4/1995 | Noda | 428/331 |

FOREIGN PATENT DOCUMENTS

| | | |
|---|---|---|
| 0 555 879 | 8/1993 | European Pat. Off. . |
| 0 619 342 | 10/1994 | European Pat. Off. . |
| 0 690 108 | 1/1996 | European Pat. Off. . |
| 0 757 059 | 2/1997 | European Pat. Off. . |
| 0 763 582 | 3/1997 | European Pat. Off. . |
| 0 792 687 | 9/1997 | European Pat. Off. . |
| WO 97/12940 | 4/1997 | WIPO . |

OTHER PUBLICATIONS

Database WPI, Derwent Publications, AN 97–010169, SU 788 681, Apr. 27, 1996.
Database WPI, Derwent Publications, AN 94–347207, JP 6–271 677, Sep. 27, 1994.
Database WPI, Derwent Publications, AN 95–012043, JP 6–299 093, Oct. 25, 1994.
Database WPI, Derwent Publications, AN 92–320334, JP 4–255 065, Aug. 14, 1992.
Database WPI, Derwent Publications, AN 93–162173, JP 5–093 071, Apr. 16, 1993.

*Primary Examiner*—Paul R. Michl
*Attorney, Agent, or Firm*—Oblon, Spivak, McClelland, Maier & Neustadt, P.C.

[57] ABSTRACT

Disclosed is a water-type dispersion composition comprising a polymer dispersed in an aqueous medium, the polymer being produced from a polyorganosiloxane and a vinyl polymer. The water-type dispersion composition has excellent storage stability, adhesion, alkali resistance, organic drug resistance, weather resistance, water resistance, hot water resistance, and pollution recuperative characteristics and is capable of forming a transparent and extremely hard film.

17 Claims, No Drawings

WATER-TYPE DISPERSION COMPOSITION

BACKGROUND OF THE INVENTION

1. Field of the Invention

The present invention relates to a water-type dispersion composition, and, especially to a water-type dispersion composition which has excellent storage stability, adhesion, alkali resistance, organic chemical resistance, weather resistance, hot water resistance, pollution recuperative characteristics, and the like and which is capable of forming a transparent and extremely hard film. The present invention also relates to a process for preparing this water-type dispersion composition.

2. Description of the Background Art

Coating agents are conventionally used in various field and the fields of application of these coating agents are steadily expanding. With this expansion, the characteristics required for these coating agents have advanced. There have been recent demands for coating agents which exhibit highly balanced performances in adhesion, chemical resistance, moisture resistance, weather resistance, hot water resistance, pollution recuperative characteristics, and the like and which are capable of forming an extremely hard film.

As coating agents partially satisfying such a demand, a composition including a partial condensation product of organosilane, colloidal silica dispersion liquid, and silicon-modified acrylic resin is disclosed (see Japanese Patent Application Laid-open No. 135465/1985). Also, a composition including a partial condensation product of organosilane, chelate compound of zirconium alkoxide, and a vinyl resin containing a hydrolytic silyl group is proposed (see Japanese Patent Application Laid No. 1769/1989).

However, these coating agents are all solvent types. Recently, there has been a strong demand for eliminating the use of solvents in view of low environmental pollution, resource saving, safety, sanitation, and the like. Therefore, use of these solvent-type coating agents is being eliminated in preference of aqueous coating agents.

Extensive studies have been conducted to develop reaction-type resin emulsions among these aqueous coating agents since these reaction-type resin emulsions are expected to improve performance such as water resistance, chemical resistance, and the like. Among these reaction-type resin emulsions, resin emulsions including a hydrolytic silyl group are proposed. A reaction-type resin emulsion including a vinyl polymer containing a hydrolytic silyl group and an amineimide group is disclosed in Japanese Patent Application Laid-open 26035/1995 as an example of such a resin emulsion including a hydrolytic silyl group. Also, an aqueous paint composition comprising a water dispersion composition of a vinyl polymer having an alkoxysilyl group and a water-type dispersion composition of a tin compound is disclosed in Japanese Patent Application Laid-open No. 91510/1995.

However, these resin emulsions containing a hydrolytic silyl group have inferior storage stability. If this emulsion is stored for a long period of time, there is the drawback that it gels and a paint film obtained from the emulsion after long time storage differs in characteristics from a paint film obtained from the emulsion directly after production and hence a stable quality cannot be maintained, causing problems in practice. Also, even when the storage stability is relatively high, these resin emulsions exhibit inferior balance in total performance including adhesion, chemical resistance, moisture resistance, weather resistance, hot water resistance, pollution recuperation characteristics, and the like.

The present invention has been achieved in view of these problems. It is an object of the present invention to provide a water-type dispersion composition which has extremely excellent storage stability, excellent balance in performance such as adhesion, alkali resistance, organic chemical resistance, moisture resistance, weather resistance, hot water resistance, pollution recuperation characteristics, and the like, allows a transparent and extremely hard paint film to be formed, and is useful as a coating agent.

SUMMARY OF THE INVENTION

The object of the present invention is attained by provision of a water-type dispersion composition comprising a polymer (hereinafter called "specific polymer (A)") dispersed in an aqueous medium, the polymer being produced from (a) a polyorganosiloxane and (b) a vinyl polymer.

In the present invention in which a vinyl polymer is preferably chemically combined with a polyorganosiloxane, the dispersion stability of the water-type dispersion composition is excellent.

The above object of the present invention is further attained by provision of a process for preparing a water-type dispersion composition comprising a polymer dispersed in an aqueous medium, which comprises hydrolyzing or partially condensing an organosilane and a vinyl polymer in an organic solvent in the presence of a metal chelate and an catalytic amount of water, dispersing the reaction solution in an aqueous medium, and distilling the organic solvent.

Other objects, features and advantages of the invention will hereinafter become more readily apparent from the following description.

DETAILED DESCRIPTION OF THE INVENTION AND PREFERRED EMBODIMENTS

The present invention will now be explained in detail.
(A) Specific polymer
(a) Polyorganosiloxane The components having the structure in which organosilane represented by the following general formula (1) (hereinafter called "organosilane (a1)") is polymerized by condensation are preferable as the polyorganosiloxane (a) which is one structural component of the specific polymer (A).

$$(R^1)_n Si(OR^2)_{4-n} \qquad (1)$$

wherein $R_1$ represents an organic group having from 1 to 8 carbon atoms, $R^2$ represents an alkyl group having from 1 to 5 carbon atoms or an acyl group having from 1 to 4 carbon atoms, and n denotes an integer from 0 to 2.

The following compounds are typical examples of the organic group represented by $R^1$ having from 1 to 8 carbon atoms: alkyl groups such as a methyl group, ethyl group, n-propyl group, isopropyl group, n-butyl group, isobutyl group, sec-butyl group, t-butyl group, n-pentyl group, n-hexyl group, n-heptyl group, and n-octyl group; γ-chloropropyl group, γ-bromopropyl group, 3,3,3-trifluoropropyl group, γ-glycidoxypropyl group, γ-methacryloxypropyl group, γ-mercaptopropyl group, γ-aminopropyl group, γ-dimethyl aminopropyl group, 2-(3, 4-epoxycyclohexyl) ethyl group, vinyl group, phenyl group, and the like.

A methyl group, ethyl group, n-propyl group, isopropyl group, n-butyl group, isobutyl group, sec-butyl group, t-butyl group, n-pentyl group, and the like are given as examples of the alkyl group represented by $R^2$ having from 1 to 5 carbon atoms. As examples of the acyl groups having from 1 to 4 carbon atoms, an acetyl group, propionyl group, butylyl group, and the like are given.

Typical examples of such an organosilane (a1) include alkoxysilanes such as tetramethoxysilane, tetraethoxy silane, methyltrimethoxysilane, methyltriethoxysilane, n-propyltriethoxysilane, i-propyltrimethoxysilane, i-propyltriethoxy silane, γ-chloropropyltrimethoxysilane, γ-chloropropyl- triethoxysilane, 3,3,3-trifluoropropyl- methoxysilane, 3,3,3-trifluoropropyl- triethoxysilane, γ-glycidoxypropyl- trimethoxysilane, γ-glycidoxypropyl- triethoxysilane; γ-methacryloxypropyl- trimethoxysilane, γ-methacryloxypropyl- triethoxysilane, γ-mercaptopropyl- trimethoxysilane, γ-mercaptopropyl- triethoxysilane, 3,4-cyclohexyl- ethyltrimethoxysilane, 3,4-cyclohexylethyltriethoxysilane, vinyltrimethoxysilane, vinyltriethoxysilane, phenyltrimethoxysilane, phenyltriethoxysilane, dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, divinyldimethoxysilane, divinyldiethoxysilane, diphenyldimethoxysilane, and diphenyldiethoxysilane; and acyloxysilanes such as tetracethoxysilane, methyltriacethoxysilane, ethyltriacethoxysilane, dimethyldiacethoxysilane, and diethyldiacethoxysilane. Among these, methyltrimethoxysilane, methyltriethoxysilane, dimethyldimethoxysilane, dimethyldiethoxysilane, and the like are desirable.

These organosilanes (a1) may be used either singly or in combinations of two or more. It is preferable in the present invention to use mixtures containing a compound represented by the general formula $R_1Si(OR^2)_3$ and a compound represented by the general formula $R^1{}_2Si(OR^2)_2$ wherein the content of the former compound in the mixture is 40% by weight or more. The mixture especially containing a compound represented by the formula $CH_3Si(OR^2)_3$ in an amount preferably 40% by weight or more, and more preferably from 50% by weight or more, is used to prepare a particularly excellent water-type dispersion composition.

In the present invention, organosilane (a1) is used as is or as a hydrolytic material (after hydrolysis) and/or a partial condensation material (after partial condensation). In this case, when the specific polymer (A) is manufactured, a polyorganosilane chain is formed by a condensation reaction of organosilane (a1) and, at the same time, a condensation reaction of a hydroxylyl group produced by hydrolysis of organosilane (a1) and a hydroxysilyl group in the vinyl polymer (b1) described below is produced, whereby the polyorganosiloxane chain can be connected chemically with the vinyl polymer (b1).

The polystyrene conversion weight average molecular weight (hereinafter abbreviated as "Mw") of the above partial condensation product of organosilane (a1) is preferably from 800 to 100,000, and more preferably from 1,000 to 50,000.

(b) Vinyl Type Polymer Component

As the vinyl polymer (b) which is another structural component of the specific polymer (A) of the present invention, it is preferable to use a polymer (hereinafter called "vinyl polymer (b1)") in which the principal chain is composed of a vinyl polymer having at least one and preferably two or more hydrolytic silyl groups or hydroxysilyl groups (hereinafter these silyl groups are summarized as "hydrolytic silyl group and the like" at the terminal or side chain thereof and which has at least one and preferably two or more hydrophilic functional group.

The hydrolytic silyl group and the like in the vinyl polymer (b1) are shown in the following general formula (2) in general.

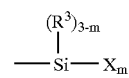

(2)

wherein X represents a hydrolytic group such as a halogen atom, alkoxy group, acyloxy group, aminoxy group, phenoxy group, thioalkoxy group, or amino group, or a hydroxyl group, $R^3$ represents a hydrogen atom, an alkyl group having from 1 to 10 carbon atoms or aralkyl group having from 1 to 10 carbon atoms, and m denotes an integer of from 1 to 3.

One or more hydrolytic silyl group and the like may be contained in the vinyl polymer (b1).

Moreover, for example, a carboxyl group, carboxylic acid anhydride, hydroxyl group, amino group, amine imide group, and the like are given as examples of the hydrophilic functional group in the vinyl polymer (b1). Though one or more of these hydrophilic functional groups may be contained in the vinyl polymer (b1), it is desirable that two or more of any of, for example, a carboxylic group, hydroxyl group, and amineimide group coexist.

The vinyl polymer (b1) is produced, for example, by a method (i) in which a hydrosilane compound having a hydrolytic silyl group is reactionally added to a carbon—carbon double bond of a vinyl polymer (hereinafter called "functional unsaturated polymer") having the carbon—carbon double bond and a hydrophilic functional group. Also, a vinyl polymer (b1) can be manufactured by a method (ii) of copolymerizing a vinyl monomer possessing a hydrolytic silyl group and the like and a vinyl monomer which possesses a hydrophilic functional group.

The functional unsaturated polymer used in the method (i) can be produced, for example, by the following methods.

Specifically, the functional group having a carbon—carbon double bond in the side chain of the polymer molecular chain can be produced by a method (i-1) in which a vinyl monomer having a hydrophilic functional group is copolymerized with another vinyl monomer as required to synthesize a precursory polymer (copolymer) and then an appropriate functional group (hereinafter called "complementary functional group (α)") is reacted with an unsaturated compound having a functional group (hereinafter called "complementary functional group (β)") capable of reacting with the functional group (α) and also having a carbon—carbon double bond.

Also, the functional unsaturated polymer can be manufactured by a method (i-2) of polymerizing the vinyl monomer having a hydrophilic functional group or, optionally, copolymerizing this vinyl monomer with another vinyl monomer copolymerizable with this vinyl monomer, using a radical polymerization initiator (for example, 4,4-azobis-4-cyanovaleric acid or the like) having the complementary functional group (α) or a compound having a complementary functional group (α) which is complementary to both the radical polymerization initiator and a chain transfer agent (for example, 4,4-azobis-4-cyanovaleric acid and dithioglycolic acid or the like), to synthesize a precursory polymer (copolymer) having the complementary functional group (α) derived from the radical polymerization initiator or the chain transfer agent at one or both terminals of the molecular chain of the polymer. Then, an unsaturated compound having the complementary functional group (β) and a carbon-carbon double bond is reacted with the complementary functional group (α) in the precursory polymer to produce a functional unsaturated polymer having a carbon—carbon double bond at one or both terminals of the molecular chain of the polymer.

In addition, the functional unsaturated polymer can be manufactured by a method (i-3) which is a combination of the method (i-1) and method (i-2).

The following reactions are examples of a reaction of the complementary functional group (α) and the complementary functional group (β) in the methods (i-1) and (i-2). Specifically, these examples include an esterification reaction of a carboxyl group and a hydroxyl group, ring-opening esterification reaction of a carboxylic acid anhydride group and a hydroxyl group, esterification reaction of a carboxyl group and an epoxy group, amidation reaction of a carboxyl group and an amino group, ring-opening amidation reaction of a carboxylic acid anhydride group and an amino group, ring-opening addition reaction of an epoxy group and an amino group, and urethanization reaction of a hydroxyl group and an isocyanate group.

Given as examples of the vinyl monomers having a hydrophilic functional group are unsaturated carboxylic acids such as (meth)acrylic acid, crotonic acid, maleic acid, fumaric acid, itaconic acid, and the like; unsaturated acid anhydrides such as maleic acid anhydride, itaconic acid anhydride, and the like; vinyl monomers having a hydroxyl group such as 2-hydroxyethyl (meth)acrylate, 2-hydroxypropyl (meth)acrylate, 3-hydroxypropyl (meth) acrylate, N-methylol (meth)acrylamide, 2-hydroxyethyl vinyl ether, and the like; vinyl monomers containing an amino group such as 2-aminoethyl (meth)acrylate, 2-aminopropyl (meth)acrylate, 3-aminopropyl (meth) acrylate, 2-dimethylaminoethyl (meth)acrylate, 2-diethylaminoethyl- (meth)acrylate, 2-dimethylaminopropyl- (meth)acrylate, 3-dimethylaminopropyl (meth)acrylate, 2-aminoethyl vinyl ether, N,N-dimethylaminomethaacrylamide, and the like; vinyl monomers containing an amideimide group such as 1,1,1-trimethylamine (meth)acrylimide, 1-methyl-1-ethylamine (meth)acrylimide, 1,1-dimethyl-1-(2-hydroxypropyl)amine (meth)acrylimide, 1,1-dimethyl-1-(2'-phenyl-2'-hydroxyethyl)amine (meth)acrylimide, 1,1-dimethyl-1-(2'-hydroxy-2'-phenoxypropyl)amine (meth) acrylimide, and the like. These vinyl monomers may be used either independently or in combinations of two or more.

Among the vinyl monomers having a hydrophilic functional group, (meth)acrylic acid is especially desirable in a group consisting of unsaturated carboxylic acids and unsaturated carboxylic acid anhydrides; 2-hydroxyethyl (meth) acrylate is especially desirable in a group consisting of a hydroxyl group containing vinyl monomers; and (meth) acrylic acid amideimides having a hydroxyl group, such as 1,1-dimethyl-1-(2-hydroxypropyl)amine (meth)acrylimide, 1,1-dimethyl-1-(2'-phenyl-2'-hydroxyethyl)amine (meth) acrylimide, and 1,1-dimethyl-1-(2'-hydroxy-2'-phenoxypropyl)amine (meth) acrylimide are desirable in a group consisting of an amino group containing vinyl monomers and an amine imide group containing vinyl monomers.

As the other vinyl monomers to be copolymerized with the vinyl monomer having a hydrophilic functional group, the following compounds can be used. Specifically, examples of the other vinyl monomers include, besides vinyl monomers containing an epoxy group such as glycidyl (meth) acrylate, allyl glycidyl ether, and the like, (meth) acrylates such as methyl (meth)acrylate, ethyl (meth) acrylate, n-propyl (meth)acrylate, isopropyl (meth)acrylate, n-butyl (meth)acrylate, t-butyl (meth)acrylate, 2-ethylhexyl (meth)acrylate, cyclohexyl (meth) acrylate, and the like; unsaturated amide compounds such as (meth)acrylamide, crotonamide, maleic acid diamide, fumaric acid diamide, itaconic acid diamide, α-ethylacrylamide, N-butoxymethyl (meth)acrylamide and the like; vinyl monomers having a carbonyl group such as methacrolein, croton aldehyde, formylstyrene, formyl-α-methylstyrene, diacetonacrylamide, (meth)acrylamide pivalin aldehyde, 3-(meth)acrylamide methyl-anisaldehyde, β-(meth) acryloxy-α,α-dimethyl-propanal (that is, β-(meth) acryloxypivalinaldehyde), β-(meth)acryloxy-α,α-diethylpropanal, β-(meth)acryloxy-α,α-dipropylpropanal, β-(meth)acryloxy-α-methyl-α-butylpropanal, β-(meth) acryloxy-α,α,β-trimethylpropanal, diacetone(meth) acrylamide, vinyl ketones having from 4 to 7 carbon atoms (such as vinyl methyl ketone, vinyl ethyl ketone, vinyl n-propyl ketone, vinyl isopropyl ketone, vinyl n-butyl ketone, vinyl isobutyl ketone, vinyl t-butyl ketone, vinyl phenyl ketone, vinyl benzyl ketone, divinyl ketone), diacetone (meth)acrylate, acetonitrile(meth)acrylate, 2-hydroxypropyl(meth)acrylate-acetyl acetate, 3-hydroxypropyl(meth)acrylate-acetyl acetate, 2-hydroxybutyl(meth)acrylate-acetyl acetate, 3-hydroxybutyl(meth)acrylate-acetyl acetate, 4-hydroxybutyl(meth)acrylate-acetyl acetate, butane diol-1, 4-(meth)acrylate-acetyl acetate, and the like; (meth) acrylonitrile, styrene, α-methylstyrene, vinyl chloride, vinyl acetate, and vinyl propionate. These vinyl monomers may be used either independently or in combinations of two or more.

Examples of the unsaturated compounds having the complementary functional group (β) and the carbon-carbon double bond include the unsaturated carboxylic acids, unsaturated carboxylic acid anhydrides, vinyl monomers containing a hydroxyl group, and vinyl monomers containing an amino group among the above vinyl monomers having a hydrophilic functional group. Other than the above, unsaturated compounds containing an epoxy group such as glycidyl(meth)acrylate, allylglycidyl ether, and the like, unsaturated compounds produced by reacting the above vinyl monomer containing a hydroxyl group with an equivalent mol of diisocyanate compound, and the like are also given as examples of the unsaturated compounds having the complementary functional group (β) and the carbon-carbon double bond.

Given as examples of the hydrosilane compounds having a hydrolytic group, which are used in the method (i), are halogenated silanes such as methyldichlorosilane, phenyldichlorosilane, trichlorosilane, and the like; alkoxy silanes such as methyldimethoxysilane, methyldiethoxysilane, phenyldimethoxysilane, trimethoxysilane, triethoxysilane, and the like; acyloxysilanes such as methyldiacetoxysilane, phenyldiacetoxysilane, triacetoxysilane, and the like; aminoxysilanes such as dimethyl.aminoxysilane, methyldiaminoxysilane, triaminoxysilane, and the like; phenoxysilanes such as methyldiphenoxysilane, triphenoxysilane, and the like; thioalkoxysilanes such as methyldi (thiomethoxy) silane, tri (thiomethoxy) silane, and the like; aminosilanes such as methyl.diaminosilane, triaminosilane, and the like. These hydrosilane compounds may be used either singly or in combinations of two or more.

Next, the hydrolytic silyl group-containing vinyl monomers used in the above method (ii) are represented by the following general formula (3):

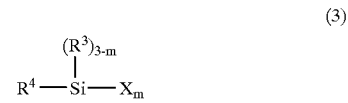

wherein X, $R^3$, and m are the same as defined in the above formula (2) and $R^4$ represents an organic group having a polymerizable carbon—carbon double bond.

Typical examples of such a vinyl monomer having a hydrolytic silyl group are $CH_2=CHSi(CH_3)(OCH_3)_2$, $CH_2=CHSi(OCH_3)_3$, $CH_2=CHSi(CH_3)Cl_2$, $CH_2=CHSiCl_3$, $CH_2=CHCOOO(CH_2)_2Si(CH_3)(OCH_3)_2$, $CH_2=CHCOO(CH_2)_2Si(OCH_3)_3$, $CH_2=CHCOO(CH_2)_3Si(CH_3)(OCH_3)_2$, $CH_2=CHCOO(CH_2)_3Si(OCH_3)_3$, $CH_2=CHCOO(CH_2)_2Si(CH_3)Cl_2$, $CH_2=CHCOO(CH_2)_2SiCl_3$, $CH_2=CHCOO(CH_2)_3Si(CH_3)Cl_2$, $CH_2=CHCOO$ (CH$_2$)$_3$SiCl$_3$, CH$_2$=C(CH$_3$)COO(CH$_2$)$_2$Si(CH$_3$)(OCH$_3$)$_2$, CH$_2$=C(CH$_3$)COO(CH$_2$)$_2$Si(OCH$_3$)$_3$, CH$_2$=C(CH$_3$)COO(CH$_2$)$_3$Si(CH$_3$)(OCH$_3$)$_2$, CH$_2$=C(CH$_3$)COO(CH$_2$)$_3$Si(OCH$_3$)$_3$, CH$_2$=C(CH$_3$)COO(CH$_2$)$_2$Si(CH$_3$)Cl$_2$, CH$_2$=C(CH$_3$)COO(CH$_2$)$_2$SiCl$_3$ CH$_2$=C(CH$_3$)COO(CH$_2$)$_2$Si(CH$_3$)Cl$_2$, CH$_2$=C(CH$_3$)COO(CH$_2$)$_3$SiCl$_3$, and the like.

Also, the compounds represented by the following formulae are given as examples of the vinyl monomers having a hydrolytic silyl group:

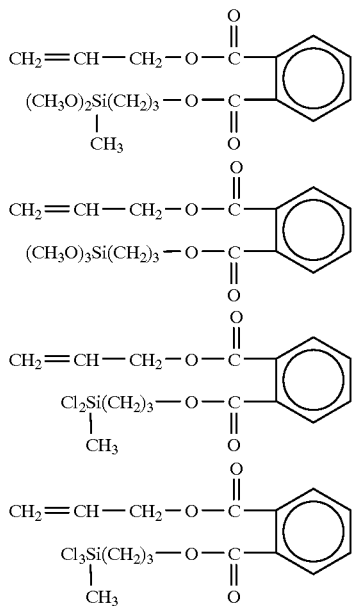

These vinyl monomers having a hydrolytic silyl group may be used either independently or in combinations of two or more.

As the vinyl monomer having a hydrophilic functional group, which is used in the method (ii), materials similar to the vinyl monomers exemplified for the method (i) can be used either singly or in combinations of two or more.

Also, one or more of the other vinyl monomers exemplified for the method (i) may be copolymerized in the method (ii).

A monomer (hereinafter called "monomer X" containing a polymerizable unsaturated group and a UV light stabilizing group and/or a UV absorbing group may be copolymerized with the vinyl polymer (b1). A water-type dispersion composition which has especially excellent storage stability and weather resistance can be obtained if the monomer X is copolymerized.

There are no limitations to the polymerizable unsaturated group of the monomer X to the extent that the monomer X can copolymerize with the other monomers.

The polymerizable unsaturated groups, UV stabilizing groups, and UV absorbing groups are each present either singly or in combinations of two or more in the monomer X. If a plurality of polymerizable unsaturated groups is used, these groups may be the same or different. So are the UV stabilizing groups, and UV absorbing groups.

Given as examples of the monomer X are compounds in which a polymerizable unsaturated group is introduced into a UV stabilizing compound or UV absorbing compound such as steric amine compounds, salicylic acid compounds, benzophenone compounds, benzotriazole compounds, and the like.

As the monomer X used in the present invention, the steric amine compounds having a polymerizable unsaturated group are preferable and, among these, steric piperidine compounds (hereinafter called "piperidine type monomer") having a polymerizable unsaturated group are particularly preferable.

Though there are no limitations to the piperidine type monomer, preferable examples of the piperidine type monomer include 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloyloxy-2,2,6,6-tetramethylpiperidine, 4-cyano-4-(meth)acryloylamino-2,2,6,6-tetramethylpiperidine, 4-cyano-4-(meth)acryloyloxy-1,2,2,6,6-pentamethylpiperidine, 4-cyano-4-(meth)acryloylamino-1,2,2,6,6-pentamethylpiperidine, 1-(meth)acryloyl-4-(meth)acryloyloxy-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloyloxy-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 4-crotonoyloxy-1,2,2,6,6-pentamethylpiperidine, 4-crotonoylamino-1,2,2,6,6-pentamethylpiperidine, 4-cyano-4-crotonoyloxy-2,2,6,6-tetramethylpiperidine, 4-cyano-4-crotonoylamino-2,2,6,6-tetramethylpiperidine, 1-crotonoyl-4-crotonoyloxy-2,2,6,6-tetramethylpiperidine, 1-crotonoyl-4-crotonoylamino-2,2,6,6-tetramethylpiperidine, 1-crotonoyl-4-cyano-4-crotonoyloxy-2,2,6,6-tetramethylpiperidine, 1-crotonoyl-4-cyano-4-crotonoylamino-2,2,6,6-tetramethylpiperidine, and the like.

Among these piperidine type monomers, 4-(meth)acryloyloxy-2,2,6,6-tetramethylpiperidine and 4-(meth)acryloyloxy-1,2,2,6,6-pentamethylpiperidine are particularly preferable.

Examples of the monomer X excluding the above piperidine type monomers include salicylic acid compounds such as phenylsalicylic acid (meth)acrylate, t-butylphenylsalicylic acid (meth)acrylate, and the like; benzophenone compounds such as 2-(meth)acryloyloxy-4-methoxybenzophenone, 2-(meth)acryloyloxy-2'-hydroxy-4-methoxybenzophenone, 2,2'-di(meth)acryloyloxy-4-methoxybenzophenone, 2,2'-di(meth)acryloyloxy-4,4'-dimethoxybenzophenone, 2-(meth)acryloyloxy-4-methoxy-2'-carboxybenzophenone, 2-hydroxy-4-[3-(meth)acryloyloxy-2-hydroxypropoxy]benzophenone, 2,2'-dihydroxy-4-[3-(meth)acryloyloxy-2-hydroxypropoxy]benzophenone, and the like; benzotriazole compounds such as 2-[2'-(meth)acryloyloxy-5'-methylphenyl]benzotriazole, 2-[2'-(meth)acryloyloxy-5'-t-octylphenyl]benzotriazole, 2-[2'-(meth)acryloyloxy-3',5'-di-t-butylphenyl] benzotriazole; and the like. Other than the above, 2-ethylhexyl-2-cyano-3,3-diphenyl (meth)acrylate, 1,3-bis (4-benzoyl-3-hydroxyphenoxy)-2-propyl (meth)acrylate, ethyl-2-cyano-3,3-diphenyl (meth)acrylate, and the like are exemplified.

The compounds used as the monomer X may be used either singly or in combinations of two or more.

The proportion of the monomer X to the total monomers in the vinyl polymer used in the present invention is generally 20% by weight or less, preferably 10% by weight or less, and more preferably from 1 to 5% by weight. If the proportion exceeds 20% by weight, the water resistance of the film tends to be lower.

The content of the vinyl monomer containing a hydrophilic functional group in the vinyl polymer (b1) is preferably from 0.05 to 50% by weight, and more preferably from 0.05 to 40% by weight.

Also, the particularly preferable content of the vinyl monomer containing a hydrophilic functional group in the vinyl polymer (b1) varies depending on the sort of the vinyl monomer as follows:

(1) The particularly preferable total content of the unsaturated carboxylic acid and/or unsaturated carboxylic acid anhydride is from 0.5 to 10% by weight;

(2) The particularly preferable content of the vinyl monomer containing a hydroxyl group is from 5 to 30% by weight; and (3) The particularly preferable total content of the amino group-containing vinyl monomer and/or amineimide containing-vinyl monomer is from 0.05 to 3% by weight.

The content of the vinyl monomer containing a hydrophilic functional group is in the above defined range in the present invention, whereby the storage stability of the resulting water-type dispersion composition is remarkably excellent.

Also, in the present invention, it is preferable that two or more of any of the vinyl monomers indicated by the above (1), (2), and (3) are used in combination and it is particularly preferable that one or more of each vinyl monomer indicated by the above (1), (2), and (3) are used in combination.

The number average molecular weight (converted to polystyrene, hereinafter called "Mn") of the vinyl polymer prepared in this manner is preferably from 2,000 to 100,000, and more preferably from 4,000 to 50,000.

In addition, it is desirable that the vinyl polymer possess 1–20 silyl groups in one molecule.

The vinyl polymer (b1) may be used in the present invention either singly or in combinations of two or more.

The amount of the vinyl polymer (b) is generally from 2 to 900 parts by weight, preferably from 10 to 400 parts by weight, and more preferably from 20 to 200 parts by weight to 100 parts by weight of polyorganosiloxane (a). If the amount of the vinyl polymer (b) is not more than 2 parts by weight, the alkali resistance of the film formed from the water-type dispersion composition tends to decrease. On the other hand, if the amount of the vinyl polymer (b) exceeds 900 parts by weight, the weather resistance of the film tends to decrease.

Synthesis of Specific Polymer (A)

The water-type dispersion composition of the present invention comprises the specific polymer (A) dispersed in an aqueous medium, the specific polymer (A) being produced from a polyorganosiloxane (a) and a vinyl polymer (b). Preferably, the polyorganosiloxane (a) is chemically combined with the vinyl polymer (b). In this case, the specific polymer (A) is dispersed in the form of particles or an aqueous sol. When the specific polymer (A) is formed of particles, the average particle diameter is generally from 0.01 to 100 μm and each particle contains the polyorganosiloxane (a) and the vinyl polymer (b). Though the aqueous medium in the water-type dispersion composition of the present invention is substantially composed of water, it may include an organic solvent such as alcohol and the like in an amount of several tens percent.

The water-type dispersion composition of the present invention is preferably manufactured by a method (iii) of hydrolyzing and/or partially condensing organosilane (a1) and the vinyl polymer (b1) in an organic solvent in the presence of the metal chelate (B) described below and an catalytic amount of water, dispersing the reaction solution in an aqueous medium, and distilling the organic solvent.

The amount of water in the step of hydrolysis and/or partial condensation in the method (iii) is generally in the order of 1.2 to 3.0 mols and preferably in the order of 1.3 to 2.0 mols to 1 mol of organosilane (a1).

As the aqueous medium, water or a water soluble organic solvent, or a mixture of these, is used.

An emulsifying agent, pH adjusting agent, and the like may be used in the step of dispersing the reaction product in the aqueous medium.

Examples of the above emulsifying agent include anionic surfactants such as alkyl sulfate, alkylaryl sulfate, alkyl phosphate, fatty acid salt, and the like; cationic surfactants such as alkyl amine salts, alkyl quaternary amine, and the like; nonionic surfactants such as polyoxyethylene alkyl ether, polyoxyethylene alkylaryl ether, block-type polyether, and the like; amphoteric surfactants such as carboxylic acid types (for example, amino acid types, betaine types, and the like), sulphonic acid types, and the like. These emulsifying agents may be used either independently or in combinations of two or more.

For example, alcohols, aromatic hydrocarbons, ethers, ketones, esters, and the like are preferable as the organic solvent used in the method (iii). These organic solvents may be partially removed before the reaction solution is dispersed in the aqueous medium.

The hydrolysis and partial condensation in the method (iii) are carried out under the reaction conditions of a temperature of from 40° C. to 70° C. and a reaction time of from 1 to 8 hours.

In the method (iii), when the vinyl polymer (b) contains an acidic group such as a carboxylic group, carboxylic acid anhydride group, or the like, at least one basic compound is added to adjust the pH after the hydrolysis and/or the partial condensation. Also, when the vinyl polymer (b) contains a basic group such as an amino group, amideimide group, or the like, at least one acidic compound is added to adjust the pH after the hydrolysis and/or the partial condensation. Further, when the vinyl polymer (b) contains the acidic group and the basic group, at least one basic or acidic compound is added corresponding to the proportions of the acidic and basic groups to adjust the pH after the hydrolysis and/or the partial condensation. By these treatments, the hydrophilic properties of the resulting specific polymer (A) is improved, whereby the emulsion-dispersion capability of the specific polymer (A) can be increased.

Given as examples of the above basic compound are amines such as ammonia, methylamine, dimethylamine, trimethylamine, ethylamine, diethylamine, triethylamine, ethanolamine, diethanolamine, dimethylaminoethanol, and the like; and hydroxides of an alkaline metal such as potassium hydroxide, sodium hydroxide, and the like. Examples of the above acidic compound include inorganic acids such as hydrochloric acid, phosphoric acid, sulfuric acid, nitric acid, and the like; and organic acids such as formic acid, acetic acid, propionic acid, lactic acid, oxalic acid, citric acid, adipic acid, (meth) acrylic acid, maleic acid, fumaric acid, itaconic acid, and the like.

The pH value in the pH adjusting step is generally from 6 to 10 and preferably from 7 to 8.

(B) Metal Chelate Compound

In the preparation of the specific polymer (A), it is desirable to formulate a chelate compound of a metal selected from a group consisting of zirconium, titanium, and aluminum (hereinafter called "metal chelate compound (B)").

It is considered that the metal chelate compound (B) has functions of promoting the hydrolysis and/or partial condensation of the above polyorganosiloxane (a) and the vinyl polymer (b) and of promoting the formation of the condensate of both components.

Examples of such a metal chelate compound (B) include compounds represented by the formulae:

or partial hydrolyzates of these compounds.

In the above metal chelate compounds, $R^5$ and $R^6$ respectively represent a monovalent hydrocarbon group having from 1 to 6 carbon atoms, specifically, an ethyl group, n-propyl group, isopropyl group, n-butyl group, sec-butyl group, t-butyl group, n-pentyl group, n-hexyl group, cyclohexyl group, or phenyl group; $R^7$ represents a monovalent hydrocarbon group having from 1 to 6 carbon atoms similar to $R^5$ or $R^6$ and, other than these, an alkoxy group having from 1 to 16 carbon atoms, specifically, a methoxy group, ethoxy group, n-propoxy group, isopropoxy group, n-butoxy group, sec-butoxy group, t-butoxy group, lauryloxy group, stearyloxy group, or the like; p and q denote integers from 0 to 3 respectively; and r denotes an integer from 0 to 2.

Typical examples of such a metal chelate compound (B) include zirconium chelate compounds such as:
tri-n-buthoxy.ethylacetoacetate zirconium,
di-n-butoxy.bis(ethylacetoacetate) zirconium,
n-butoxy.tris(ethylacetoacetate) zirconium,
tetrakis(n-propylacetoacetate) zirconium,
tetrakis(acetylacetoacetate) zirconium,
tetrakis(ethylacetoacetate) zirconium, and the like;
titanium chelate compounds such as:
di-isopropoxy.bis(ethylacetoacetate) titanium,
di-isopropoxy.bis(acetylacetate) titanium,
di-isopropoxy.bis (acetylacetone) titanium, and the like;
aluminum chelate compounds such as:
di-isopropoxy.ethylacetoacetate aluminum,
di-isopropoxy.acetylacetonato aluminum,
isopropoxy.bis(ethylacetoacetate) aluminum,
isopropoxy.bis (acetylacetonate) aluminum,
tris(ethylacetoacetate) aluminum,
tris(acetylacetonate) aluminum,
monoacetylacetonate bis (ethylacetoacetate) aluminum, and the like.

Among these compounds, tri-n-butoxy ethylacetoacetate zirconium, di-isopropoxy.bis(acetylacetonate) titanium, di-isopropoxy.ethylacetoacetate aluminum, and tris (ethylacetoacetate) aluminum are preferable. These compounds used for the metal chelate compound (B) are used either independently or in combinations of two or more.

The metal chelate compound (B) is preferably dissolved in an organic solvent when used. Preferred examples of the organic solvent in this case include alcohols, aromatic hydrocarbons, ethers, ketones, esters, and the like.

The amount of the metal chelate compound (B) is preferably from 0.01 to 50 parts by weight, more preferably from 0.1 to 50 parts by weight, and most preferably from 0.5 to 10 parts by weight to 100 parts by weight of polyorganosiloxane (a). If the amount of the metal chelate compound (B) is not more than 0.01 parts by weight, the formation of the condensate of the polyorganosiloxane (a) and the vinyl polymer (b) is insufficient, whereby the weather resistance of the film formed from the water-type dispersion composition tends to be low. On the other hand, if the amount exceeds 50 parts by weight, the storage stability of the water-type dispersion composition tends to decrease and the film tends to crack easily.

(C) β-Keto Compounds

The water-type dispersion composition of the present invention may include at least one of the β-diketones represented by the general formula described below and/or β-ketoesters (hereinafter these compounds are collectively called "β-keto compound (C)") to improve the storage stability further:

$R^6COCH_2COR^7$ wherein $R^6$ and $R^7$ are the same as defined for $R^6$ and $R^7$ in the above general formula representing the metal chelate compound (B).

It is desirable that the β-keto compound (C) be further compounded especially when the water-type dispersion composition of the present invention contains the above metal chelate compound (B).

Typical examples of such a β-keto compound (C) include acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexanedione, 2,4-hepatanedione, 3,5-heptanedione, 2,4-octanedione, 2,4-nonanedione, and 5-methyl-2,4-hexanedione. Among these, ethyl acetoacetate and acetylacetone are preferable and acetylacetone is particularly preferable.

The amount of β-keto compound (C) is generally 2 mols or more, and preferably from 3 to 20 mols to one mol of the metal chelate compound (B). If the amount of β-keto compound (C) is not more than 2 mols, the effect on improvement in storage stability of the resulting water-type dispersion composition tends to decrease.

(D) Filler

The water-type dispersion composition of the present invention is especially suitable for use in the fields of coating agents. When the water-type dispersion composition is used for a coating agent, a filler (D) may be added and dispersed in the water-type dispersion composition to further increase the hardness of the resulting film and to develop various properties of the film such as coloration, film thickening characteristics, effects on prevention of UV light transmission to a base material, corrosion resistance, heat resistance, and the like.

Particles and/or a sol or colloid of an inorganic compound canbe used as a filler (hereinafter called "filler (D1)") which is added to further increase the hardness of the film.

Specific examples of the inorganic compound include $SiO_2$, $Al_2O_3$, $Al(OH)_3$, $Sb_2O_5$, $Si_3N_4Sn$—$In_2O_3$, $Sb$—$In_2O_3$, $MgF$, $CeF_3$, $CeO_2$, $Al_2O_3$, $3Al_2O_3 2SiO_2$, $BeO$, $SiC$, $AlN$, $Al_2O_3$, $Fe$, $Fe_2O_3$, $CO$, $Co$-$FeO_x$, $CrO_2$, $Fe_4N$, $Ba$ ferrite, $SmCO_5$, $YCO_5$, $CeCO_5$, $PrCO_5$, $Sm_2CO_{17}$, $Nd_2Fe_{14}B$, $ZrO_2$, $Al_4O_3$, $AlN$, $SiC$, $BeO$, and the like.

These inorganic compounds may be used either independently or in combinations of two or more.

The state of the filler (D1), before it is formulated into the water-type dispersion composition, may be a particulate powder, aqueous sol or colloid in which microparticles are dispersed in water, a solvent-type sol or colloid in which microparticles are dispersed in a polar solvent such as isopropyl alcohol or the like or in a non-polar solvent such as toluene or the like. The solvent-type sol or colloid may be used by diluting it with water or a solvent, depending on the dispersibility of the semiconductor microparticles.

The solid concentration of the filler (D1) is preferably 40% by weight when the filler (D1) is an aqueous sol or colloid or solvent-type sol or colloid.

Among materials used for the filler (D1), colloidal silica is commercially available under the trademarks Snowtex, Methanol Silica Sol, Isopropanol Silica Sol (manufactured by Nissan Chemical Industries Ltd.); Cataloid SN, Oscal (manufactured by Catalyst & Chemicals Industries Co., Ltd.); Ludex (manufactured by Du Pont in USA); Syton (manufactured by Mosanto in USA); Nalcoag (manufactured by Nalco Chemical in USA); and the like. The above-described colloidal alumina is also commercially available under the trademarks Alumina Sol-100, Alumina Sol-200, Alumina Sol-520 (manufactured by Nissan Chemical Industries Ltd.); Alumina Clear Sol, Alumina Sol 10, Alumina Sol 132 (manufactured by Kawaken Fine Chemical Co., Ltd.); and the like.

The filler (D1) may be compounded in the water-type dispersion composition after the water-type dispersion composition is prepared or when the water-type dispersion composition is prepared to carry out the hydrolysis or partial condensation of organosilane (a1) and the vinyl polymer (b1) in the presence of the filler (D1).

The amount of the filler (D1) as a solid is generally from 0 to 500 parts by weight and preferably from 0.1 to 400 parts by weight to 100 parts by weight of polyorganosiloxane (a).

Examples of a filler (hereinafter called "filler (D2)"), which develops the characteristics of the film such as coloring, designing, and film thickening, and which promotes corrosion resistance and weather resistance, include metals and alloys; compounds such as metal oxides, hydroxides, carbides, nitrides, sulfates, and the like; and non-aqueous pigments such as organic pigments, inorganic pigments, and the like. These components are used in the form of particles, filaments, whiskers, or scales.

Typical examples of materials for the filler (D2) include iron, nickel, aluminum, zinc, copper, silver, carbon black, graphite, stainlesssteel, ferricoxide, ferrite, cobaltoxide, manganese oxide, chromium oxide, pigment zirconium oxide, pigment titanium oxide, zirconium oxide, silicon dioxide, lead suboxide, aluminum oxide, zinc oxide, copper suboxide, iron dihydroxide, aluminum hydroxide, calcium hydroxide, barium carbonate, calcium carbonate, magnesium carbonate, lead sulfate, basic leadsulfate, bariumsulfate, gypsum, molybdenum disulfide, leadsulfide, coppersulfide, leadsilicate, calcium hydrochloride, copper borate, potassium titanate, silicon carbide, silicon nitride, boron nitride, lead phthalate, synthetic mullite, clay, diatomaceous earth, talc, bentonite, mica, green earth, cobalt green, manganese green, viridian, Guignet's green, cobalt-chromium green, Schulek green, chromium green, zinc green, pigment green, ultramarine blue, rock ultramarine blue, iron blue, cobalt blue, selrian blue, molybdenum blue, cobalt violet, mars violet, manganese violet, pigment violet, zinc yellow, chromium yellow, cadmium yellow, strontium yellow, titanium yellow, litharge, pigment yellow, loess, cadmium red, selenium red, chromium vermilion, red iron oxide, lead zinc flower, bunchison white, manganese white, bone black, diamond black, thermatomic black, plant black, and the like.

These materials for the filler (D2) may be used either independently or in combinations of two more.

The amount of the filler (D2) of the present invention is generally 300 parts by weight or less to 100 parts by weight of the total solid of the water-type dispersion composition. If the amount of the filler (D2) exceeds 300 parts by weight, there is the case where the adhesion of the film decreases.

(E) Photocatalytic Component

Semiconductor particles or sol, which have a photocatalytic activity, may be added to the water-type dispersion composition of the present invention to provide the water-type dispersion composition with anti-microbacterial and anti-fungus activities, and resistance to contamination.

Given as examples of compounds used as the photocatalytic component are $TiO_2$, $TiO_3$, $SrTiO_3$, $FeTiO_3$, $WO_3$, $SnO_2$, $Bi_2O_3$, $In_2O_3$, ZnO, $Fe_2O_3$, $RuO_2$, CdO, CdS, CdSe, GaP, GaAs, $CdFeO_3$, $MOS_2$, $LaRhO_3$, and the like. Among these, $TiO_2$ and ZnO are preferable.

These semiconductors may be used either singly or in combinations of two or more.

It was confirmed in the present invention that the surface of the film exhibited hydrophilicity in a short time even by a small amount of light owing to the photocatalytic activity of the semiconductor, whereby the resistance to contamination of the film was remarkably improved without substantial damage to other characteristics of the film. Also, in the film produced from the water-type dispersion composition, the semiconductor is condensed with the above component (A) and hence high hydrophilicity and resistance to contamination of the film are maintained for a long period of time.

The configurations of the photocatalytic component before it is formulated into the water-type dispersion composition are classified into three types including particulate powder, aqueous sol in which microparticles are dispersed in water, and solvent-type sol in which microparticles are dispersed in a polar solvent such as methanol, isopropyl alcohol, or the like, or in a non-polar solvent such as toluene or the like. The solvent-type sol or colloid may be used by diluting it with water or a solvent depending on the dispersibility of the semiconductor microparticles.

The solvent-type sol may be further diluted with water or a solvent depending on the dispersibility of the semiconductor when it is used. The average particle diameter of the semiconductor microparticles in these configurations is preferably as small as possible, generally 1 μm or less, and preferabl 0.5 μm or less. Theaqueoussolandthe solvent-type sol may be surface-treated in advance using a surfactant, dispersant, and organic metal compound to improve the stability and dispersibility of the microparticles.

When the photocatalytic component (E) is an aqueous sol or a solvent-type sol, the solid content of the photocatalytic component is preferably 50 parts by weight and more preferably 40% by weight.

The photocatalytic component (E) may be compounded in the water-type dispersion composition after the water-type dispersion composition is prepared or when the water-type dispersion composition is prepared to carry out the hydrolysis or partial condensation of organosilane (a1) and the vinyl polymer (b1) in the presence of the photocatalytic component (E).

The amount of the photocatalytic component (E) as a solid is generally from 0 to 500 parts by weight and preferably from 0.1 to 400 parts by weight to 100 parts by weight of polyorganosiloxane (a).

The photocatalytic component (E) may be dispersed in the water-type dispersion composition after the water-type dispersion composition is prepared or when the water-type dispersion composition is prepared to carry out the hydrolysis or partial condensation of organosilane (a1) and the vinyl polymer (b1) in the presence of the photocatalytic component (E). If the photocatalytic component is added when preparing the water-type dispersion composition, the above semiconductor compound can be condensed with the polyorganosilane (a1), the vinyl polymer (b1), and the like, whereby the storage stability of the water-type dispersion composition is improved and the lasting durability in resistance to contamination of the film is improved. When the photocatalytic component (E) is an aqueous sol, it is desirable that the photocatalytic component (E) be added when preparing the water-type dispersion composition. Also, when the viscosity of the system is increased by the addition of the filler (D) and the like, it is desirable that the photocatalytic component be added when preparing the water-type dispersion composition.

The amount of the photocatalytic component (E) as a solid is generally from 1 to 500 parts by weight and preferably from 5 to 400 parts by weight to 100 parts by weight of the polyorganosiloxane (a).

(F) Hardening Accelerator

A hardening accelerator (F) other than the above-described metal chelate compound may be used in the water-type dispersion composition depending on the curing conditions to increase the curing rate. This hardening accelerator is particularly effective when the curing treatment is performed at comparatively low temperatures.

Given as examples of the hardening accelerator (F) are alkali metal salts such as naphthenic acid, octylic acid, nitrous acid, sulfurous acid, aluminic acid, carbonic acid, and the like; amine type compounds such as ethylenediamine, hexanediamine, diethylenetriamine, triethylenetetramine, tetraethylenepentamine, piperidine, piperazine, methaphenylenediamine, ethanolamine, triethylamine, 3-aminopropyltriethoxysilane, 3-(2-aminoethyl)aminopropyltrimethoxysilane, 3-(2-aminoethyl)aminopropylmethyldimethoxysilane, 3-anilinopropyltrimethoxysilane, various modified amines used as a hardening agent for an epoxy resin, and the like;

carboxylic acid type organic tin compounds such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $Sn(OCOCC_8H_{17})_2$, and the like; mercaptide type organic tin compounds such as $(C_4H_9)_2Sn(SCH_2COOC_8H_{17})_2$, $(C_4H_9)_2Sn(SCH_2CH_2COOC_8H_{17})_2$, $(C_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_{12}H_{25})_2$, $(C_8H_{17})_2Sn(SCH_2CH_2COOC_{12}H_{25})_2$, the compounds represented by the following formula, and the like;

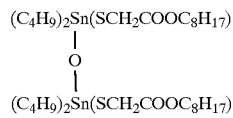

sulfide type organic tin compounds such as $(C_4H_9)_2Sn=S$, $(C_8H_{17})_2Sn=S$, compounds represented by the following formula, and the like;

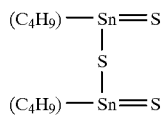

organic tin oxides such as $(C_4H_9)_2SnO$, $(C_8H_{17})_2SnO$, and the like; and reaction products of these organic tin oxides and ester compounds such as ethyl silicate, dimethyl maleate, diethyl maleate, dioctyl phthalate.

These hardening accelerators (F) may be used either independently or in combinations of two or more.

The amount of the hardening accelerator (F) is generally from 0 to 100 parts by weight, preferably from 0.1 to 80 parts by weight, and most preferably from 0.5 to 50 parts by weight to 100 parts by weight of the polyorganosiloxane (a).

Given as the methods for adding the hardening accelerator (F) to the water-type dispersion composition are a method of diluting the hardening accelerator with an alcoholic solvent and adding the dispersion, a method of adding an emulsifier to the hardening accelerator, followed by adding the resulting mixture to water, and the like.

(G) Multifunctional Hydrazine Derivative

The water-type dispersion composition of the present invention may further contain a multifunctional hydrazine derivative (hereinafter called "multifunctional hydrazine derivative (G)") having two or more hydrazino group in a molecule. It is desirable that this multifunctional hydrazine derivative (G) be compounded in the case where the vinyl polymer (b), which is a component of the polymer (A), contains a carbonyl group. The multifunctional hydrazine derivative (G) has the function in which the hydrazino group reacts with a carbonyl group contained in the polymer (A) to form a network structure and thereby to promote the linking of the film.

Given as preferred examples of the functional hydrazine derivative (G) are aqueous dihydrazines including dicarboxylic acid dihydrazides having from 2 to 10 and preferably from 4 to 6 carbon atoms in total, such as oxalic acid dihydrazide, malonic acid dihydrazide, succinic acid dihydrazide, glutaric acid dihydrazide, adipic acid dihydrazide, sebacic acid dihydrazide, phthalic acid dihydrazide, isophthalic acid dihydrazide, terephthalic acid dihydrazide, maleic acid dihydrazide, fumaric acid dihydrazide, itaconic acid dihydrazide, and the like; hydrazides having three or more functional groups, such as citric acid trihydrazide, nitriloaccetic acid trihydrazide, cyclohexanetricarboxylic acid trihydrazide, ethylenediaminetetraccetic acid tetrahydrazide, and the like; aliphatic dihydrazines having 2 to 4 carbon atoms in total, such as ethylene-1,2-dihydrazine, propylene-1,2-dihydrazine, propylene-1,3-dihydrazine, butylene-1,2-dihydrazine, butylene-1,3-dihydrazine, butylene-1,4-dihydrazine, butylene-2,3-dihydrazine, and the like.

Also, used as the multifunctional hydrazine derivative are compounds (hereinafter called "blocked multifunctional hydrazine derivative") which are blocking-treated by reacting at least part of hydrazino groups contained in the aqueous dihydrazine with a carbonyl compound such as acetaldehyde, propionaldehyde, butylaldehyde, acetone, methyl ethyl ketone, diethyl ketone, methyl propyl ketone, methyl butyl ketone, diacetone alcohol. For example, dihydrazidemonoacetone-hydrazone adipate, dihydrazidediacetonehydrazone adipate, or the like, which is the blocked multifunctional hydrazine derivative, is also used. Using such a blocked multifunctional hydrazine derivative, the progress of the linking reaction of the water-type dispersion composition is appropriately controlled, hence re-dispersibility which is important an characteristic for a printing ink is further improved.

Among these multifunctional hydrazine derivatives, adipic acid dihydrazide, sebacic acid dihydrazide, isophthalic acid dihydrazide, dihydrazidediacetonehydrazone adipate, or the like is preferable.

These multifunctional hydrazine derivatives may be used either independently or in combinations of two or more.

The amount of multifunctional hydrazine derivative (G) used is such that the equivalent ratio of the carbonyl group in the polymer (A) to the hydrazino group is generally in a range of from 1:0.1–5, preferably from 1:0.5–1.5, and more preferably from 1:0.7–1.2. In this case, if the equivalent ratio of the hydrazino group to one equivalent of the carbonyl group is not more than 0.1, resistance to solvent and to damage of the film tend to decrease. On the other hand, if the equivalent ratio of the hydrazino group exceeds 5, water resistance and transparency of the film tend to decrease. When the blocked multifunctional hydrazine derivative is used as the multifunctional hydrazine derivative, the equivalent ratio of the carbonyl group to the hydrazino group in the multifunctional hydrazine derivative before the multifunctional hydrazine derivative is blocked is used as the target equivalent ratio.

The multifunctional hydrazine derivative (G) may be formulated in the water-type dispersion composition of the present invention in any of the steps of preparing the water-type dispersion composition. However, it is desirable that the multifunctional hydrazine derivative (G) be all formulated in the water-type dispersion composition after the polymer (A) is produced, to restraint the occurrence of flocks in the step of preparing the polymer (A) and to maintain the stability in polymerization.

Other Additives

The water-type dispersion composition of the present invention may contain resinoid additives.

Examples of the resinoid additives include aqueous polyester resins usually used for an aqueous paint, aqueous or water-dispersible epoxy resins, aqueous or water-dispersible acryl resins, aromatic vinyl resins containing a carboxyl group such as a styrene-maleic acid copolymer and the like, urethane resins, and the like.

These resinoid additives may be used either singly or in combinations of two or more.

The amount of the resinoid additive in the present invention is generally 50 parts by weight or less and preferably 30 parts by weight or less to 100 parts by weight of the total solids of the water-type dispersion composition.

In addition, the water-type dispersion composition of the present invention may contain an organic solvent to improve the filming characteristics and the wettability.

Examples of the organic solvent include alcohols such as methyl alcohol, ethyl alcohol, n-propyl alcohol, isopropyl alcohol, n-butyl alcohol, isobutyl alcohol, n-amyl alcohol, n-hexyl alcohol, and the like, ethylene glycol menomethyl ether, ethylene glycol monoethyl ether, ethylene glycol mono-n-propyl ether, ethylene glycol mono-isopropyl ether, ethylene glycol mono-n-butyl ether, ethylene glycol mono-n-hexyl ether, diethylene glycol monomethyl ether, diethylene glycol monoethyl ether, diethylene glycol mono-isopropyl ether, ethylene glycol monomethyl ether acetate, ethylene glycol monoethyl ether acetate, tributoxymethyl phosphate and the like.

These organic solvents may be used either singly or in combinations of two or more.

The amount of the organic solvent is generally 50% by weight or less and preferably 20 by weight or less of the total amount of the water-type dispersion composition.

The water-type dispersion composition of the present invention may include, as required, other additives such as a dehydrating agent such as methyl orthoformate, methyl orthoacetate, tetraethoxysilane, and the like, a pigment, thickener, dispersing agent, silane coupling agent, titan coupling agent, leveling agent, dye, fungicide, antiseptic agent, UV absorber, photostabilizer, age register, antioxidant, adhesive, cloud resistive agent, flame retardant, and the like.

Water Type Dispersion Composition

The total solid content of the water-type dispersion composition is preferably 45% by weight or less and is appropriately controlled according to the object of use. The total solid content is usually from 5 to 20% by weight in the case where the water-type dispersion composition is used to form a thin film and/or to impregnate a substrate material, and is usually from 20 to 45% by weight and preferably from 25 to 40% by weight in the case where the water-type dispersion composition is used to form a thick film ora filler is compounded. In this case, if the total solid content exceeds 45% by weight, the storage stability of the water-type dispersion composition tends to decrease.

When the water-type dispersion composition of the present invention is used as a coating agent, it is applied to a substrate material by brushing, spraying, or dipping to form a film with a thickness of from 1 to 40 $\mu$m approximately in one application and with a thickness of from 2 to 80 $\mu$m approximately in two or three appliyications. Then, the film is dried at room temperature or is dried by heating at about 30 to 200° C. for about 10 to 60 minutes to form a coating film.

Examples of the substrate material to which the water-type dispersion composition of the present invention is applied include stainless steel, aluminum, ceramics, paper, cement, glass, plastic, inorganic ceramic material, silk cloth, and the like.

In addition, the water-type dispersion composition of the present invention is useful as a floor polishing agent, backing material for a carpet, impregnant for paper, impregnant for cloth, cement admixture, releasing agent, and the like, other than a coating agent.

Other features of the invention will become apparent in the course of the following description of the exemplary embodiments which are given for illustration of the invention and are not intended to be limiting thereof.

EXAMPLES

The present invention will be explained in more detail by way of examples, which are not intended to be limiting of the present invention.

In the examples below, "part(s)" and "%" indicate "part(s) by weight" and "% by weight" unless otherwise described.

Measurements and evaluations in examples and comparative examples were made in the following way:

Mw and Mn

These were measured by gel permeation chromatography (GPC) according to the following conditions:

Sample solution: a solution in which 1 g of organosilane (a1) or 0.1 g of vinyl polymer (b1) was dissolved in 100 cc of tetrahydrofuran;

Standard polystyrene: manufactured by Pressure Chemical Co., Ltd. USA;

Apparatus: High temperature and high speed gel permeation chromatogram (model 150-C ALC/GPC, manufactured by Waters Co., Ltd. USA);

Column: SHODEX A-8M (50 cm) manufactured by Showa Denko, K.K.;

Measuring temperature: 40° C.;

Flow rate: 1cc/minute.

Storage Stability

A water-type dispersion composition, to which no hardening agent had been added, was stored in a plugged polyethylene bottle at normal temperature for three months to determine by visual inspection whether it gelled or not. Further, the viscosity of the water-type dispersion composition, which did not gel, was measured using a BM type viscometer manufactured by TOKYO KEIKI CO., LTD. and the case where the rate of change was within 20% was determined as "no change".

Adhesion

A tape peeling test was performed three times according to the cross-cut adhesion test of JIS K5400 and the adhesion was determined by the average of the three test results.

Hardness

The hardness was determined by pencil hardness according to JIS K5400.

Alkali Resistance

With respect to alkali resistance (1), 1 cc of an aqueous sodium hydroxide with a concentration of 1 to 40% was dropped on a film, which was allowed to stand in a Petri dish for 6 hours and then washed with water to observe the condition of the film and thereby to determine the maximum concentration of sodium hydroxide to the extent that no abnormality of the film was observed.

With respect to alkali resistance (2), a substrate material on which a film was formed by application was dipped into an aqueous saturated calcium hydroxide solution for 60 days to observe the condition of the film. The case where no abnormality was observed is indicated by the symbol "◯".

Resistance to Chemicals

A test strip on which a film was formed was dipped into isopropyl alcohol in a Petri dish for 60 days and was then wiped with cloth to observe the condition of the film. The case where no abnormality was observed is indicated by the symbol "◯".

Moisture resistance

A test strip on which a film was formed was continuously kept under the conditions of a temperature of 50 C. and a humidity of 95% for 1,000 hours. The test strip was removed to observe the condition of the film. The case where no abnormality was observed is indicated by the symbol "◯".

Weather Resistance

A test strip on which a film was formed was subjected to a 2,000 hour irradiation test using a weatherometer according to JIS K5400 to observe the condition of the film. The case where no abnormality was observed is indicated by the symbol "◯".

Water Resistance

A test strip on which a film was formed was dipped into tap water at normal temperature for 60 days to observe the condition of the film. The case where no abnormality was observed was rated by the symbol "◯".

Hot Water Resistance

A test strip on which a film was formed was dipped into hot water at 60° C. for 14 days to observe the condition of the film. The case where no abnormality was observed is indicated by the symbol "◯".

Pollution Recuperative Characteristics

A mixed paste of carbon black/kerosene=1/2 (ratio by weight) was applied to a film of a test sample, which was allowed to stand at room temperature for 24 hours and was then washed with water using a sponge to observe the pollution condition of the film by visual inspection. The case where no contamination was observed is indicated by the symbol "◯".

Initial Transparency

A water-type dispersion composition was applied to a quartz plate with a thickness of 1 mm using an applicator so that the dried film thickness was 30 μm. The quartz plate was dried at 80° C. for 10 minutes to coat the quartz plate. The transmittance (%) of the coated quartz plate for light of a wave length of 400 nm was measured using an absorptiometer (U-3210, manufactured by Hitachi, Ltd.).

Transparency after Exposure to UV Light

The coated quartz plate used for the evaluation of the initial transparency was irradiated with UV light (310 nm wave length) at a dose of 0.47 W/m$^2$/nm at 60° C. under saturated vapor pressure for 8 hours using a QUV (solar eye, FS-40 lamp, manufactured by Q Panel Co., Ltd.) and was then kept in the dark at 50° C. for 4 hours. These steps were repeated so that the coated quartz plate was exposed to UV light for 300 hours in total. After that, the transmittance (%) of the coated quartz plate for light of a wave length of 400 nm was measured using an absorptiometer (U-3210, manufactured by Hitachi, Ltd.).

UV Light Absorption Coefficient before Exposure to UV Light

The coated quartz plate used for the evaluation of the initial transparency for light of a wave length of 360 nm was measured using an absorptiometer (U-3210, manufactured by Hitachi, Ltd.).

UV light absorption coefficient after exposure to UV light

The coated quartz plate used for the evaluation of the initial transparency was irradiated with UV light (310 nm wave length) at a dose of 0.47 W/m$^2$/nm at 60° C. under saturated vapor pressure for 8 hours using a QUV (solar eye, FS-40 lamp, manufactured by Q Panel Co., Ltd.) and was then kept in the dark at 50° C. for 4 hours. These steps were repeated so that the coated quartz plate was exposed to UV light for 300 hours in total. After that, the absorption coefficient (%) of the coated quartz plate for light of a wave length of 360 nm was measured using an absorptiometer (U-3210, manufactured by Hitachi, Ltd.).

Hydrophilicity

A film of a test sample was irradiated with light from a black light fluorescent lamp at a dose of 0.05 mW/cm$^2$ for 5 hours. The water contact angle of the film was measured. It is understood that the lower the contact angle, the higher the resistance to contamination.

Reference Example 1

<Preparation of Partial Condensate of Oorganosilane (a1)>

100 parts of methyltrimethoxysilane, 30 parts of dimethyldimethoxysilane, 12 parts of ion exchange water, 0.01 parts of 0.1N hydrochloric acid, and 10 parts of isopropyl alcohol were placed in a reaction vessel equipped with a reflux condenser and a stirrer and were mixed. The mixture was heated to 60° C. while agitating and was reacted at the same temperature for 3 hours to prepare a solution containing a partial condensate of organosilane (a1) with a solid content of 44%. The Mw of this partial condensate was 12,000.

Reference Example 2

<Preparation of vinyl polymer>

70 parts of methyl methacrylate, 40 parts of n-butyl acrylate, 20 parts of γ-methacryloxypropyltrimethoxysilane, 5 parts of acrylic acid, 13 parts of 2-hydroxyethyl methacrylate, 2 parts of 1,1,1-trimethylamine methacrylimide, and 130 parts of isopropyl alcohol were placed in a reaction vessel equipped with a reflux condenser and a stirrer and were mixed. The mixture was heated to 80° C. while agitating. A solution, in which 4 parts of azobisisovaleronitrile was dissolved in 10 parts of xylene was added dropwise to the mixture for 30 minutes and the mixed solution was reacted at 80° C. for 5 hours to prepare a solution containing a vinyl polymer (b1) with a solid content of 50%. This vinyl polymer had a Mw of 12,000 and possessed 6 silyl groups in average in a molecule. This vinyl polymer (b1) is shown as "vinyl polymer (II-1)".

Reference Examples 3 to 10

<Preparation of Vinyl Polymers>

Solutions containing the vinyl polymers (II-2) to (II-8) of the present invention and comparative vinyl polymer (ii-1) were prepared in the same manner as in reference Example 2 except that components shown in Tables 1 and 2 were used.

TABLE 1

| | Reference Example | | | | | |
|---|---|---|---|---|---|---|
| | 2 | 3 | 4 | 5 | 6 | 7 |
| Vinyl polymer | II-1 | II-2 | II-3 | II-4 | II-5 | ii-1 |
| <Formulation (part)> | | | | | | |
| Diacetone acrylamide | — | — | 6 | 6 | 12 | — |
| Methyl methacrylate | 70 | 85 | 42 | 53 | 38 | 80 |
| n-Butyl acrylate | 40 | 40 | 24 | 24 | 22 | 50 |
| γ-Methacryloxypropyl trimethoxysilane | 20 | 20 | 12 | 12 | 12 | — |
| Acrylic acid | 5 | 5 | 5 | 5 | 5 | 5 |
| 2-Hydroxyethyl methacrylate | 13 | — | 10 | — | 10 | 13 |
| 1,1,1-Trimethylamine methacrylimide | 2 | — | 1 | — | 1 | 2 |
| Azobisisovaleronitrile | 4 | 4 | 3 | 3 | 3 | 4 |
| i-Propyl alcohol | 130 | 130 | 85 | 85 | 85 | 130 |
| Xylene | 10 | 10 | 15 | 15 | 15 | 10 |

TABLE 1-continued

|  | Reference Example | | | | | |
|---|---|---|---|---|---|---|
|  | 2 | 3 | 4 | 5 | 6 | 7 |
| Vinyl polymer | II-1 | II-2 | II-3 | II-4 | II-5 | ii-1 |
| Mn | 12,000 | 16,000 | 15,000 | 17,000 | 15,000 | 12,000 |
| Number of silyl groups (per molecule) | 6 | 6 | 6 | 6 | 6 | 6 |

TABLE 2

|  | Reference Example | | |
|---|---|---|---|
|  | 8 | 9 | 10 |
| Vinyl polymer | II-6 | II-7 | II-8 |
| <Monomer composition (part)> | | | |
| γ-Methacryloxypropyltrimethoxysilane | 15 | 30 | 10 |
| 4-Methacryloyloxy-1,2,2,6,6 pentamethylpiperidine | 5 | — | 1 |
| 4-Methacryloyloxy-2,2,6,6-tetramethylpipendine | — | 1 | 1 |
| Diacetone acrylamide | 6 | 6 | 6 |
| Methyl methacrylate | 40 | 38 | 43 |
| 2-Ethylhexyl methacylate | 18 | 9 | 23 |
| Acrylic acid | 5 | 5 | 5 |
| 2-Hydroxyethyl methacrylate | 10 | 10 | 10 |
| 1,1,1-Trimethylamine methacrylimide | 1 | 1 | 1 |
| Azobisisovaleronitrile | 3 | 3 | 3 |
| Isopropyl alcohol | 85 | 85 | 85 |
| Xylene | 15 | 15 | 15 |
| Resin concentration (%) | 50 | 50 | 50 |
| Mw (×10³) | 12 | 11 | 13 |

Example 1

<Preparation of Specific Polymer (A)>

In a reaction vessel equipped with a reflux condenser and a stirrer, 100 parts of methylmethoxysilane as organosilane (a1) and 50 parts of the vinyl polymer (II-1) prepared in reference Example 2 were mixed with a solution in which 20 parts (0.07 molar equivalent) of di-isopropoxy ethylacetoacetate aluminum as the metal chelate compound was dissolved in 40 parts of isopropyl alcohol. To the mixture was added 30 parts of ion exchange water, which was reacted at 60° C. for 4 hours. Next, the reaction products were cooled to room temperature and to the reaction products was added 20 parts (0.2 molar equivalent) of acetylacetone as the β-keto compound (IV) to obtain a solution of specific polymer (A) with a solid content of 40%.

<Emulsification and Dispersion>

2 parts of alkyl sulfate as an emulsifying agent and 5 parts of 10% aqueous ammonia were added to the solution of specific polymer (A) and sufficiently mixed to adjust the pH to 7.5. Next, the mixture was diluted with 200 parts of isopropyl alcohol. The resulting solution was gradually added to 500 parts of ion exchanged water for 2 hours to form an emulsion. Then, isopropyl alcohol and water were distilled from the emulsion at 50° C. or less under reduced pressure and the total solid content was adjusted to 3% to prepare a water-type dispersion composition 1 of the present invention.

The results of evaluating the storage stability of the water-type dispersion composition 1 are shown in Table 3.

Example 2

<Preparation of Specific Polymer (A)>

130 parts of the solution containing the partial condensate of organosilane (a1) obtained in reference Example 1 was reacted with 50 parts of vinyl polymer (II-1) obtained in reference Example 2 at 60° C. for 4 hours to prepare a solution of a specific polymer (A).

<Emulsification and Dispersion>

The water-type dispersion composition 2 of the present invention was prepared by emulsification and dispersion in the same manner as in Example 1 except that the above-described solution of the specific polymer (A) was used.

The results of evaluating the storage stability of the water-type dispersion composition are shown in Table 3.

Examples 3–31 and Comparative Example 1

The water-type dispersion compositions 3–31 of the present invention and a comparative water-type dispersion composition i were produced in the same manner as in Example 1 except that the components shown in Tables 3–7 were used.

The result s of evaluating the storage stability of the water-type dispersion compositions 3–31 and i are shown in Table 3–7 together.

TABLE 3

(Unit: part by weight)

|  | Example | | | | | | |
|---|---|---|---|---|---|---|---|
|  | 1 | 2 | 3 | 4 | 5 | 6 | 7 |
| Water-type dispersion | 1 | 2 | 3 | 4 | 5 | 6 | 7 |
| <Organosilane> | | | | | | | |
| Methyltrimethoxysilane | 100 | — | 80 | 50 | 4 | 100 | 100 |
| Dimethyldimethoxysilane | — | — | — | 50 | — | — | — |
| Tetraethoxysilane | — | — | 20 | — | — | — | — |
| Partially condensed product of organosilane *1 | — | 130 | — | — | — | — | — |

TABLE 3-continued (Unit: part by weight)

| | Example | | | | | | |
|---|---|---|---|---|---|---|---|
| | 1 | 2 | 3 | 4 | 5 | 6 | 7 |
| Water-type dispersion | 1 | 2 | 3 | 4 | 5 | 6 | 7 |
| <Vinyl polymer> | | | | | | | |
| II-1 | 50 | 50 | 50 | — | 50 | 150 | 50 |
| II-2 | — | — | — | 50 | — | — | — |
| ii-1 | — | — | — | — | — | — | — |
| <Metal chelate compound> | | | | | | | |
| Di-i-propoxy.ethylacetoacetate aluminum | 20 | — | 25 | 20 | 0.6 | 20 | 20 |
| <Isopropyl alcohol> | 40 | 10 | 30 | 40 | 12 | 40 | 40 |
| <Ion-exchanged water> | 30 | 12 | 35 | 30 | 0.9 | 30 | 30 |
| <β-Keto compound> | | | | | | | |
| Acetylacetone | 20 | — | 25 | 20 | 0.6 | 20 | 20 |
| <Emulsion/dispersion> | | | | | | | |
| Emulsifyer | 2 | 2 | 2 | 2 | 2 | 3 | — |
| 10% aqueous ammonia | 5 | 5 | 5 | 5 | 5 | 14 | 5 |
| Isopropyl alcohol | 200 | 200 | 200 | 200 | 140 | — | — |
| Ion-exchanged water | 500 | 500 | 500 | 500 | 300 | 600 | 500 |
| Storage stability | No change | No change | No change | No change | No change | No change | No change |

*1 Oganosilane obtained in Reference Example 1

TABLE 4

(Unit: part by weight)

| | Example | | | | | | | | |
|---|---|---|---|---|---|---|---|---|---|
| | 8 | 9 | 10 | 11 | 12 | 13 | 14 | 15 | 16 |
| Water-type dispersion | 8 | 9 | 10 | 11 | 12 | 13 | 14 | 15 | 16 |
| <Organosilane> | | | | | | | | | |
| Methyltrimethoxysilane | 70 | — | 70 | 60 | — | 100 | 4 | 70 | 70 |
| Dimethyldimethoxysilane | 30 | — | 30 | — | 80 | — | — | 30 | 30 |
| Tetraethoxysilane | — | — | — | 40 | 20 | — | — | — | — |
| Partially condensed product of organosilane *1 | — | 152 | — | — | — | — | — | — | — |
| <Vinyl polymer> | | | | | | | | | |
| a-1 II-3 | 50 | 50 | 50 | 50 | 50 | 50 | 50 | — | — |
| a-2 II-4 | — | — | — | — | — | — | — | 50 | — |
| a-3 II-5 | — | — | — | — | — | — | — | — | 50 |
| <Metal chelate compound> | | | | | | | | | |
| Di-isopropoxy.ethylacetoacetate aluminum | 5 | — | 5 | 9 | 5 | 6 | 0.2 | 5 | 5 |
| <Isopropyl alcohol> | 60 | — | 60 | 60 | 60 | 60 | 20 | 60 | 60 |
| <Ion-exchanged water> | 13 | — | 13 | 18 | 13 | 15 | 0.5 | 13 | 13 |
| <β-Keto compound> | | | | | | | | | |
| Acetylacetone | 5 | — | 5 | 9 | 6 | 6 | 0.2 | 5 | 5 |
| <Emulsion/dispersion> | | | | | | | | | |
| Emulsifyer | 2 | 2 | 2 | 2 | 2 | 2 | 0.1 | 2 | 2 |
| 10% aqueous ammonia | 5 | 5 | 5 | 5 | 5 | 5 | 3 | 5 | 5 |
| Isopropyl alcohol | 100 | 100 | 100 | 100 | 100 | 100 | 30 | 100 | 100 |
| Ion-exchanged water | 200 | 200 | 200 | 200 | 200 | 200 | 60 | 200 | 200 |
| <Polyfunctional hydrazine derivative> | | | | | | | | | |
| ADH (10% aqueous solution) *2 | 4 | 4 | — | 4 | 4 | 4 | 4 | 4 | 4 |
| ADH-DA (10% aqueous solution) *2 | — | — | 4 | — | — | — | — | — | — |
| Storage stability | No change | No change | No change | No change | No change | No change | No change | No change | No change |

*1 Organosilane obtained in Reference Example 1
*2 ADH: Adipic acid dihydrazide
ADH-DA: Adipic acid dihydrazide diacetonehydrazone

TABLE 5

(Unit: part by weight)

| | Example | | | | | |
|---|---|---|---|---|---|---|
| | 17 | 18 | 19 | 20 | 21 | 22 |
| Water-type dispersion | 17 | 18 | 19 | 20 | 21 | 22 |
| <Organosilane> | | | | | | |
| Methyltrimethoxysilane | 70 | 60 | 70 | 70 | 4 | 70 |
| Tetraethoxysilane | — | 40 | — | — | — | — |
| Dimethyldimethoxysilane | 30 | — | 30 | 30 | — | 30 |
| <Vinyl polymer> | | | | | | |
| II-6 | 50 | 50 | — | — | 50 | 50 |
| II-7 | — | — | 50 | — | — | — |
| II-8 | — | — | — | 50 | — | — |
| <Metal chelate compound> | | | | | | |
| Di-isopropoxy.ethylacetoacetate aluminum | 5 | — | — | 5 | 0.2 | 5 |
| Di-isopropoxy.bis(acetylacetonate) titanium | — | 5 | — | — | — | — |
| Tri-n-butoxy.ethylacetoacetate zirconium | — | — | 5 | — | — | — |
| <β-Keto compound> | | | | | | |
| Acetylacetone | 5 | 5 | 5 | — | 0.2 | 5 |
| Ethyl acetdacetate | — | — | — | 5 | — | — |
| <Ion-exchanged water> | 13 | 13 | 13 | 13 | 0.5 | 7 |
| <Colloidal additive> | | | | | | |
| Methanol silica sol | — | — | — | — | — | 10 |
| <Isopropyl alcohol> | 60 | 60 | 60 | 60 | 20 | 60 |
| Solid component concentration (%) | 35 | 35 | 34 | 35 | 35 | 35 |
| Storage stability | No change | No change | No change | No change | No change | No change |

TABLE 6

(Unit: part by weight)

| | Example | | | | | | | | | Comparative Example |
|---|---|---|---|---|---|---|---|---|---|---|
| | 23 | 24 | 25 | 26 | 27 | 28 | 29 | 30 | 31 | i |
| Water-type dispersion | 23 | 24 | 25 | 26 | 27 | 28 | 29 | 30 | 31 | i |
| <Organosilane (a1)> | | | | | | | | | | |
| Methyltrimethoxysilane | 100 | 100 | 100 | 100 | 100 | — | 80 | 100 | 100 | 100 |
| Dimethyldimethoxysilane | — | — | — | — | — | — | — | — | — | — |
| Tetraethoxysilane | — | — | — | — | — | — | 20 | — | — | — |
| Partially condensed product of organo-silane *1 | — | — | — | — | — | 130 | — | — | — | — |
| <Vinyl polymer> | | | | | | | | | | |
| II-1 | 50 | 50 | 50 | 50 | 50 | 50 | 50 | 150 | — | — |
| II-2 | — | — | — | — | — | — | — | — | 50 | — |
| ii-1 | — | — | — | — | — | — | — | — | — | 50 |
| <Metal chelate compound> | | | | | | | | | | |
| Di-isopropoxy.ethylacetoacetate aluminum | 20 | 20 | 20 | 20 | 20 | — | 25 | 20 | 20 | 20 |
| <Isopropyl alcohol> | 40 | 40 | 40 | 40 | 40 | 10 | 30 | 40 | 40 | 40 |
| <Ion-exchanged water> | 30 | 30 | 30 | 30 | 30 | 12 | 35 | 30 | 30 | 30 |
| <β-Keto compound> | | | | | | | | | | |
| Acetylacetone | 20 | 20 | 20 | 20 | 20 | — | 25 | 20 | 20 | 20 |
| <Photocatalytic component> | | | | | | | | | | |
| Aqueous sol of titanium oxide- | 120 | 300 | 700 | — | — | 300 | 300 | 300 | 300 | — |
| Powdery titanium oxide (average diameter: 0.01 μm) | — | — | — | 300 | — | — | — | — | — | — |
| Powdery titanium oxide (average diameter: 0.05 μm) | — | — | — | — | 300 | — | — | — | — | — |

TABLE 6-continued (Unit: part by weight)

|  | Example | | | | | | | | | Comparative Example |
|---|---|---|---|---|---|---|---|---|---|---|
|  | 23 | 24 | 25 | 26 | 27 | 28 | 29 | 30 | 31 | i |
| Water-type dispersion | 23 | 24 | 25 | 26 | 27 | 28 | 29 | 30 | 31 | i |
| <Emulsion/dispersion> | | | | | | | | | | |
| Emulsifier | 2 | 2 | 2 | 2 | 2 | 2 | 2 | 3 | — | 2 |
| 10% aqueous ammonia | 5 | 5 | 5 | 5 | 5 | 5 | 5 | 14 | 5 | 5 |
| Isopropyl alcohol | 200 | 200 | 200 | 200 | 200 | 200 | 200 | — | — | — |
| Ion-exchanged water | 500 | 500 | 500 | 500 | 500 | 500 | 500 | 600 | 500 | 500 |
| Storage stability | No change | No change | No change | No change | No change | No change | No change | No change | No change | No change |

*1 Organosilane obtained in Reference Example 1

Test Examples 1–19 and Comparative Test Example 1

Each mixture prepared according to the formulation shown in Tables 8 and 9 using the water-type dispersion compositions 1–16 and 23–25 of the present invention and the comparative water-type dispersion composition i was kneaded using a sandmill to prepare a composition. 2% (as a solid) of aqueous dibutyltin dilaurate as a hardening agent was added to the composition and mixed to prepare a coating agent.

Mitieposealer (epoxy resin type sealer, manufactured by Dai Nippon Toryo Co., Ltd.) was applied to a slate plate (JIS A5043F) in an amount of 50 g/m² as dry weight and dried. Each prepared coating agent was applied to the dried slate plate in an amount of 50 g/m² as dry weight and heated at 120° C. for 10 minutes to prepare a test piece. Incidentally, the coating agent of the comparative Example 1 gelled during the application since polyorganosiloxane of the water-type dispersion composition I could not be chemically combined with the vinyl polymer (ii-1) so that a test piece of the coating agent of the Comparative Example 1 could not be obtained.

The test piece prepared in the above manner was evaluated in various tests illustrated in Tables 8 and 9. The evaluation results are shown in Tables 8 and 9.

TABLE 8

|  | Test Example | | | | | | | | | |
|---|---|---|---|---|---|---|---|---|---|---|
|  | 1 | 2 | 3 | 4 | 5 | 6 | 7 | 8 | 9 | 10 |
| Kind of water-type dispersion | 1 | 2 | 3 | 4 | 5 | 6 | 7 | 8 | 9 | 10 |
| <Composition (part)> | | | | | | | | | | |
| Water-type dispersion | 100 | 100 | 100 | 100 | 100 | 100 | 100 | 100 | 100 | 100 |
| Titanium oxide | 26 | 26 | 26 | 26 | 26 | 26 | 26 | 26 | 26 | 26 |
| Viscosity increasing agent | 0.5 | 0.5 | 0.5 | 0.5 | 0.5 | 0.5 | 0.5 | 0.5 | 0.5 | 0.5 |
| Adhesion (adhered number out of 100) | 100 | 100 | 100 | 100 | 100 | 100 | 100 | 100 | 100 | 100 |
| Pencil hardness | H | 2H | H | H | H | H | H | 2H | 2H | 2H |
| Alkali resistance (1) (%) | 10 | 10 | 10 | 10 | 10 | 10 | 10 | 10 | 10 | 10 |
| Alkali resistance (2) | ○ | ○ | ○ | ○ | ○ | ○ | ○ | ○ | ○ | ○ |
| Organic chemical resistance | ○ | ○ | ○ | ○ | ○ | ○ | ○ | ○ | ○ | ○ |
| Moisture resistance | ○ | ○ | ○ | ○ | ○ | ○ | ○ | ○ | ○ | ○ |
| Weather resistance | ○ | ○ | ○ | ○ | ○ | ○ | ○ | ○ | ○ | ○ |
| Water resistance | ○ | ○ | ○ | ○ | ○ | ○ | ○ | ○ | ○ | ○ |
| Hot water resistance | ○ | ○ | ○ | ○ | ○ | ○ | ○ | ○ | ○ | ○ |
| Pollution recuperative characteristics | ○ | ○ | ○ | ○ | ○ | ○ | ○ | ○ | ○ | ○ |

TABLE 9

|  | Test Example | | | | | | | | | Comparative Test Example |
|---|---|---|---|---|---|---|---|---|---|---|
|  | 11 | 12 | 13 | 14 | 15 | 16 | 17 | 18 | 19 | 1 |
| Kind of water-type dispersion | 11 | 12 | 13 | 14 | 15 | 16 | 17 | 18 | 19 | 1 |
| <Composition (part)> | | | | | | | | | | |
| Water-type dispersion | 100 | 100 | 100 | 100 | 100 | 100 | 100 | 100 | 100 | 100 |
| Titanium oxide | 26 | 26 | 26 | 26 | 26 | 26 | 26 | 26 | 26 | 26 |
| Viscosity increasing agent | 0.5 | 0.5 | 0.5 | 0.5 | 0.5 | 0.5 | 0.5 | 0.5 | 0.5 | 0.5 |
| Adhesion (adhered number out of 100) | 100 | 100 | 100 | 100 | 100 | 100 | 100 | 100 | 100 | Gelled during coating operation |
| Pencil hardness | 3H | F | 2H | HB | 2H | 3H | H | H | H | |
| Alkali resistance (1) (%) | 10 | 10 | 10 | 10 | 10 | 10 | 10 | 10 | 10 | |

TABLE 9-continued

|  | Test Example | | | | | | | | | Comparative Test Example |
| --- | --- | --- | --- | --- | --- | --- | --- | --- | --- | --- |
|  | 11 | 12 | 13 | 14 | 15 | 16 | 17 | 18 | 19 | 1 |
| Kind of water-type dispersion | 11 | 12 | 13 | 14 | 15 | 16 | 17 | 18 | 19 | 1 |
| Alkali resistance (2) | ◯ | ◯ | ◯ | ◯ | ◯ | ◯ | ◯ | ◯ | ◯ |  |
| Organic chemical resistance | ◯ | ◯ | ◯ | ◯ | ◯ | ◯ | ◯ | ◯ | ◯ |  |
| Moisture resistance | ◯ | ◯ | ◯ | ◯ | ◯ | ◯ | ◯ | ◯ | ◯ |  |
| Weather resistance | ◯ | ◯ | ◯ | ◯ | ◯ | ◯ | ◯ | ◯ | ◯ |  |
| Water resistance | ◯ | ◯ | ◯ | ◯ | ◯ | ◯ | ◯ | ◯ | ◯ |  |
| Hot water resistance | ◯ | ◯ | ◯ | ◯ | ◯ | ◯ | ◯ | ◯ | ◯ |  |
| Pollution recuperative characteristics | ◯ | ◯ | ◯ | ◯ | ◯ | ◯ | ◯ | ◯ | ◯ |  |

Test Examples 20–25

Test pieces of the water-type dispersion compositions 20–25 of the present invention were prepared in the same manner as in Test Example 1 except that 20 (as a solid) of aqueous dibutyltin dilaurate as a hardening agent was added to these water-type dispersion compositions and mixed to prepare coating agents.

The test piece prepared in the above manner was evaluated in various tests illustrated in Table 10. The evaluation results are shown in Table 10.

TABLE 10

|  | Test Example | | | | | |
| --- | --- | --- | --- | --- | --- | --- |
|  | 20 | 21 | 22 | 23 | 24 | 25 |
| Kind of water-type dispersion | 17 | 18 | 19 | 20 | 21 | 22 |
| Adhesion (adhered number out of 100) | 100 | 100 | 100 | 100 | 100 | 100 |
| Pencil hardness | 2H | 2H | 2H | 2H | 2H | 2H |
| Alkali resistance (2) | ◯ | ◯ | ◯ | ◯ | ◯ | ◯ |
| Weather resistance | ◯ | ◯ | ◯ | ◯ | ◯ | ◯ |
| Water resistance | ◯ | ◯ | ◯ | ◯ | ◯ | ◯ |
| Hot water resistance | ◯ | ◯ | ◯ | ◯ | ◯ | ◯ |
| Pollution recuperative characteristics | ◯ | ◯ | ◯ | ◯ | ◯ | ◯ |
| Transparency before exposure to UV light (%) | 100 | 100 | 100 | 100 | 100 | 100 |
| Transparency after exposure to UV light (%) | 100 | 100 | 100 | 100 | 100 | 100 |
| UV light absorption coefficient before exposure to UV light (%) | 100 | 100 | 95 | 95 | 100 | 100 |
| UV light absorption coefficient after exposure to UV light (%) | 100 | 100 | 95 | 95 | 100 | 100 |

Test Examples 26–35

Test pieces of the water-type dispersion compositions 1 and 23–31 of the present invention were prepared in the same manner as in Test Example 20 except that the water-type dispersion compositions 1, and 23–31 of the present invention were used.

The test piece prepared in the above manner was evaluated in various tests illustrated in Table 11. The evaluation results are shown in Table 11.

TABLE 11

|  | Test Example | | | | | | | | | |
| --- | --- | --- | --- | --- | --- | --- | --- | --- | --- | --- |
|  | 26 | 27 | 28 | 29 | 30 | 31 | 32 | 33 | 34 | 35 |
| Kind of water-type dispersion | 23 | 24 | 25 | 26 | 27 | 28 | 29 | 30 | 31 | 1 |
| Adhesion (adhered number out of 100) | 100 | 100 | 100 | 100 | 100 | 100 | 100 | 100 | 100 | 100 |
| Pencil hardness | H | H | H | H | H | 2H | H | H | H | H |
| Aikali resistance (1) | 5 | 5 | 5 | 5 | 5 | 5 | 5 | 10 | 5 | 5 |
| Organic chemical resistance | ◯ | ◯ | ◯ | ◯ | ◯ | ◯ | ◯ | ◯ | ◯ | ◯ |
| Weather resistance | ** | ** | ** | ** | ** | ** | ** | ** | ** | ** |
| Water contact angle | 15 | 10 | 5 | 10 | 10 | 8 | 5 | 10 | 10 | 100 |

**No abnormality observed.

As is clear from the above explanations, the water-type dispersion composition of the present invention has excellent storage stability and exhibits superior adhesion, alkali resistance, organic drug resistance, weather resistance, water resistance, hot water resistance, pollution recuperative characteristics, and the like, and is capable of forming a transparent and extremely hard film.

Obviously, numerous modifications and variations of the present invention are possible in light of the above teachings. It is therefore to be understood that, within the scope of the appended claims, the invention may be practiced otherwise than as specifically described herein.

What is claimed is:

1. A dispersion composition comprising a polymer dispersed in an aquleous medium, the polymer being produced from a condensation reaction of (X) a vinyl polymer, wherein said vinyl polymer contains at least one hydrolytic silyl group or hydroxy silyl group, and at least one hydrophilic functional group, and (Y) either (i) at least one organosilane having the following formula (1)

$$(R^1)_n Si(OR^2)_{4-n} \tag{1}$$

wherein $R^1$ represents an organic group having from 1 to 8 carbon atoms, $R^2$ represents an alkyl group having from 1 to 5 carbon atoms or an acyl group having from 1 to 4 carbon atoms, and n denotes an integer from 0 to 2; as is, or (ii) said org anosilane after hydrolysis, or (iii) said organosilane after partial condensation.

2. The dispersion composition according to claim 1, wherein a vinyl monomer having said hydrophilic functional group is contained in the vinyl polymer:
   (1) in a total amount of from 0.5 to 10% by weight when unsaturated carboxylic acid, unsaturated carboxylic acid anhydride, or both are used as the vinyl monomer having a hydrophilic functional group;
   (2) in an amount of from 5 to 30% by weight when a vinyl monomer having a hydroxyl group is used as the vinyl monomer having a hydrophilic functional group; and
   (3) in a total amount of from 0.05 to 3% by weight when a vinyl monomer having an amino group, a vinyl monomer having an amineimide group, or both are used as the vinyl monomer having a hydrophilic functional group.

3. The dispersion composition according to claim 1, wherein the vinyl polymer has a structure in which the principal chain is formed of a vinyl polymer which includes a hydrolytic silyl group, a hydroxysilyl group, or both, and a hydrophilic functional group at the terminals, side chain, or both of the molecular chain.

4. The dispersion composition according to claim 1, wherein the vinyl polymer has a carbonyl group and a multifunctional hydrazine derivative as a linking agent.

5. The dispersion composition according to claim 1, wherein the vinyl polymer is a copolymer of a monomer having a UV light stabilizing group, a UV light absorbing group, or both.

6. The dispersion composition according to claim 1, further comprising a β-keto compound which is selected from β-diketones represented by the formula, $R^6COCH_2COR^7$, wherein $R^6$ and $R^7$ respectively represent a monovalent hydrocarbon group having from 1 to 6 carbon atoms; or a β-ketoester.

7. The dispersion composition according to claim 6, wherein the β-keto compound is selected from the group consisting of acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexanedione, 2,4-hepatanedione, 3,5-heptanedione, 2,4-octanedione, 2,4-nonanedione, and 5-methyl-2,4-hexanedione.

8. The dispersion composition according to claim 1, further comprising a photocatalytic component which is a semiconductor particle or sol having a photocatalytic activity and a compound selected from the group consisting of $Tio_2$, $TiO_3$, $SrTiO_3$, $FeTiO_3$, $WO_3$, $SnO_2$, $Bi_2O_3$, $In_2O_3$, $ZnO$, $Fe_2O_3$, $RuO_2$, $Cdo$, $CdS$, $CdSe$, $GaP$, $GaAs$, $CdFeO_3$, $MOS_2$, and $LaRhO_3$.

9. A process for preparing a dispersion composition comprising a polymer dispersed in an aqueous medium, which comprises:
   hydrolyzing or partially condensing at least one organosilane and a vinyl polymer in an organic solvent in the presence of a metal chelate and an catalytic amount of water, thereby forminlg a reaction solution, wherein the organosilane is present as is, or after hydrolysis, or after partial condensation,
   dispersing the reaction solution in an aqueous medium, and
   distilling the organic solvent, wherein said vinyl polymer contains at least one hydrolytic silyl croup or hydroxy silyl group, and at least one hydrophilic functional group, and wherein said at least one organosilane has the following formula (1)

$$(R^1)_n Si(OR^2)_{4-n} \tag{1}$$

wherein $R^1$ represents an organic group having from 1 to 8 carbon atoms, $R^2$ represents an alkyl group having from 1 to 5 carbon atoms or an acyl group having from 1 to 4 carbon atoms, and n denotes an integer from 0 to 2.

10. The process according to claim 9, wherein the organosilane is a compound selected from the group consisting of tetramethoxysilane, tetraethoxy silane, mnethyltrirnethoxysilane, methyltriethioxysilane, n-propyltriethoxysilane, i-propytltrmnethoxysilane, i-propyltriethoxy silane, γ-chloropropyltrimethoxysilane, g-chloropropyl- triethoxysilane, 3,3,3-trifluoropropyl-methoxysilaiie, 3,3,3-trifluoropropyl-triethoxysilane, γ-glycidoxypropyl-trihethoxysilane, γ-glycidoxypropyl-triethoxysilane, γ-methacryloxypropy-ltrimnethoxysilane, γ-methacryloxypropyl-triethoxysilane, γ-mercaptopiopyl-triimietlioxysilalne, γ-mercaptopropyl-triethoxysilane, 3,4-cyclohexylethyl-trimethoxysilane, 3,4-cyclohexylethylt-riethoxysilane, vinyltrimethoxysilane, vinyltriethoxysilane, phenyltrimethoxysilane, phenyltriethoxysilane, dimethyldimnethioxysilane, dimethyidiethoxysilane, diethyldinethoxysilane, diethyldietlioxysilane, di-n-propyldimethoxysilane, di-n-propyldiethoxysilanie, di-i-propyldimethoxysilane, di-i-propyldiethoxysilaiie, divinyldilmethoxysilanie, divinyldietlhoxysilane, diphenyidiinetioxysilane, dipienyildietihoxysilane, tetracethoxysilane, methyltriacethoxysilanie, ethyltriacethoxysilane, dimethyldiacethoxysilane, and diethyldiacethoxysilane.

11. The process according to claim 9, wherein the vinyl polymer has a structure in which the principal chain is formed of a vinyl polymer which includes a hydrolytic silyl group, a hydroxysilyl group, or both, and a hydrophilic functional group at the terminals, side chain, or both of the molecular chain.

12. The process according to 9, wherein the vinyl polymer has a carbonyl group and a multifunctional hydrazine derivative as a linking agent.

13. The process according to claim 9, wherein the vinyl polymer is a copolymer of a monomer having a UV light stabilizing group, a UV light absorbing group, or both.

14. The process according to claim 9, wherein the metal chelate compound is a compound selected from the group consisting of tri-n-buthoxy ethylacetoacetate zirconium, di-n-butoxy. bis (ethylacetoacetate) zirconium, n-butoxy. tris (ethylacetoacetate) zirconium, tetrakis(n-propylacetoacetate) zirconium, tetrakis(acetylacetoacetate) zirconium, tetrakis(ethylacetoacetate) zirconium, di-isopropoxy. bis(ethylacetoacetate) titanium, di-isopropoxy. bis(acetylacetate) titanium, di-isopropoxy. bis(acetylacetone) titanium, di-isopropoxy. ethylacetoacetate aluminum, di-isopropoxy. acetylacetonato aluminum, isopropoxy. bis(ethylacetoacetate) aluminum, isopropoxy. bis(acetylacetonate) aluminum, tris(ethylacetoacetate) aluminum, tris(acetylacetonate) aluminum, and monoacetylacetonate. bis (ethylacetoacetate) aluminum.

15. The process according to claim 10, wherein an emulsifying agent, a pH adjusting agent, or both are used for dispersing the reaction product in an aqueous medium.

16. The process according to claim 10, wherein the aqueous medium is water, or a mixture of water and a water soluble organic solvent.

17. The dispersion composition according to claim 1, wherein duiring said condensation reaction, a polyorganosilane chain is formed by a condensation reaction of said organoslane and, also, a condensation reaction of a hydroxysilyl gyroup produced by hydrolysis of said organosilane and the hydroxysilyl group in said vinyl polymer, is produced.

* * * * *

UNITED STATES PATENT AND TRADEMARK OFFICE
CERTIFICATE OF CORRECTION

PATENT NO. : 5,905,109

DATED : MAY 18, 1999    Page 1 of 3

INVENTOR(S): Tatuya SHIMIZU, et al.

It is certified that an error appears in the above-identified patent and that said Letters Patent is hereby corrected as shown below:

Column 31, line 15, "aquleous" should read --aqueous--.

Column 32, line 39, "i-propyltriethoxy silane" should read --i-propyltriethoxysilane
Column 32, line 37, "mnethyltrimethoxysilane" should read --methyltrimethoxysilane--.
Column 32, line 37, "methyltriethioxysilane" should read --methyltriethoxysilane--.
Column 32, line 38, "i-propytltrmnethoxysilane" should read --i-propyltrimethoxysilane--.
Column 32, line 40, "g-chloropropyl- triethoxysilane" should read --g-chloropropyltriethoxysilane--.
Column 32, line 41, "methoxysilaiie", should read --methoxysilane--.
Column 32, line 42, "trihethoxysilane" should read --trimethoxysilane--.
Column 32, line 43, "γ-methacryloxypropy-ltrimnethoxysilane" should read --γ-methacryloxypropyltrimethoxysilane--.
Column 32, line 44, "γ-mercaptopiopyltriimietlioxysilaine" should read --γ-mercaptopropyltrimethoxysilane--.
Column 32, line 49, "dimethyldimnethioxysilane" should read --dimethyldimethoxysilane--.
Column 32, line 49, "dimethyidiethoxysilane" should read --dimethyldiethoxysilane--.
Column 32, line 50, "diethyldlinethoxysilane" should read --diethyldimethoxysilane--.
Column 32, line 50, "diethyldietlioxysilane" should read --diethyldiethoxysilane--.

UNITED STATES PATENT AND TRADEMARK OFFICE
CERTIFICATE OF CORRECTION

PATENT NO. : 5,905,109

DATED : MAY 18, 1999

INVENTOR(S): Tatuya SHIMIZU, et al.

It is certified that an error appears in the above-identified patent and that said Letters Patent is hereby corrected as shown below:

Column 32, line 51, "di-n-propyldiethoxysilanie" should read --di-n-propyldiethoxysilane--.
Column 32, line 52, "di-i-propyldiethoxysilaiie" should read --di-i-propyldiethoxysilane--.
Column 32, line 53, "divinyldilmethoxysilanie" should read --divinyldimethoxysilane--.
Column 32, line 53, "divinyldietlhoxysilane" should read --divinyldiethoxysilane--.
Column 32, line 54, "diphenyidiinetioxysilane" should read --diphenyldimethoxysilane--.
Column 32, line 54, "dipienyildietihoxysilane" should read --diphenyldiethoxysilane--.
Column 32, line 55, "methyltriacethoxysilanie" should read --methyltriacethoxysilane--.
Column 33, line 3, "tri-n-buthoxy ethylacetoacetate" should read --tri-n-buthoxy ·ethylacetoacetate--.
Column 33, line 4, "di-n-butoxy.bis" should read --di-n-butoxy·bis--.
Column 33, line 4, "n-butoxy.tris" should read --n-butoxy·tris--.
Column 33, line 8, "di-isopropoxy. bis" should read --di-isopropoxy·bis--.
Column 33, line 9, "di-isopropoxy. bis" should read --di-isopropoxy·bis--.
Column 33, line 9, "di-isopropoxy." should read --di-isopropoxy·--.

UNITED STATES PATENT AND TRADEMARK OFFICE
CERTIFICATE OF CORRECTION

PATENT NO. : 5,905,109

DATED : MAY 18, 1999

INVENTOR(S): Tatuya SHIMIZU, et al.

It is certified that an error appears in the above-identified patent and that said Letters Patent is hereby corrected as shown below:

Column 33, lines 10 and 11, "di-isopropoxy. ethylacetoacetate
--di-isopropoxy·ethylacetoacetate--.
Column 33, line 11, "di-isopropoxy. acetylacetonato" should read
--di-isopropoxy·acetylacetonato--.
Column 33, line 12, "isopropoxy. bis" should read --isopropoxy·bis--.
Column 33, line 15, "lacetonate. bis"
should read --lacetonate·bis--.

Signed and Sealed this

Fourth Day of January, 2000

Attest:

Attesting Officer

*Acting Commissioner of Patents and Trademarks*